United States Patent
Kuribayashi

(10) Patent No.: US 6,246,648 B1
(45) Date of Patent: *Jun. 12, 2001

(54) ABERRATION CORRECTING APPARATUS AND INFORMATION REPRODUCING APPARATUS HAVING THE SAME

(75) Inventor: Hiroki Kuribayashi, Tsurugashima (JP)

(73) Assignee: Pioneer Electronic Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,423

(22) Filed: Oct. 5, 1998

(30) Foreign Application Priority Data

Oct. 3, 1997 (JP) ................................................ 9-270778

(51) Int. Cl.[7] ....................................................... G11B 7/00
(52) U.S. Cl. .................................. 369/44.32; 369/53.19; 369/112.02
(58) Field of Search ........................... 369/44.32, 44.26, 369/112, 109, 110, 44.23, 44.24

(56) References Cited

U.S. PATENT DOCUMENTS

| | | | | |
|---|---|---|---|---|
| 5,886,496 | * | 3/1999 | Furukawa et al. | 369/44.32 |
| 5,914,923 | * | 6/1999 | Araki et al. | 369/44.32 |
| 5,978,332 | * | 11/1999 | Itakura et al. | 369/44.32 |
| 6,078,554 | * | 6/2000 | Ootaki et al. | 369/44.32 |
| 6,078,556 | * | 6/2000 | Furukawa et al. | 369/44.32 |

* cited by examiner

Primary Examiner—Nabil Hindi
(74) Attorney, Agent, or Firm—Young & Thompson

(57) ABSTRACT

An aberration correcting apparatus is provided with: a light detection device for irradiating an information record medium, on which record information is recorded, with a light beam, and outputting a light detection signal corresponding to the record information on the basis of a reflection light of the light beam reflected from the information record medium; a tilt detection device for detecting a tilt between an information record surface of the information record medium and an optical axis of the light beam on the basis of the light detection signal; a correction device for correcting a wavefront aberration generated in the light beam due to the tilt; and a driving device for driving the correction device on the basis of the detected tilt.

8 Claims, 23 Drawing Sheets

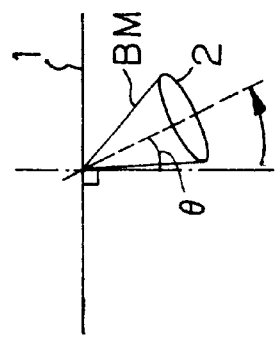
FIG. 3A
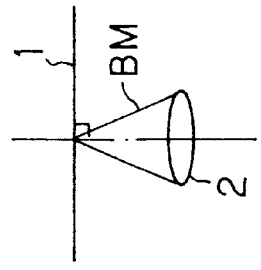
FIG. 3B
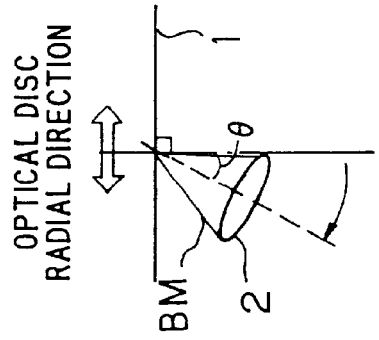
FIG. 3C
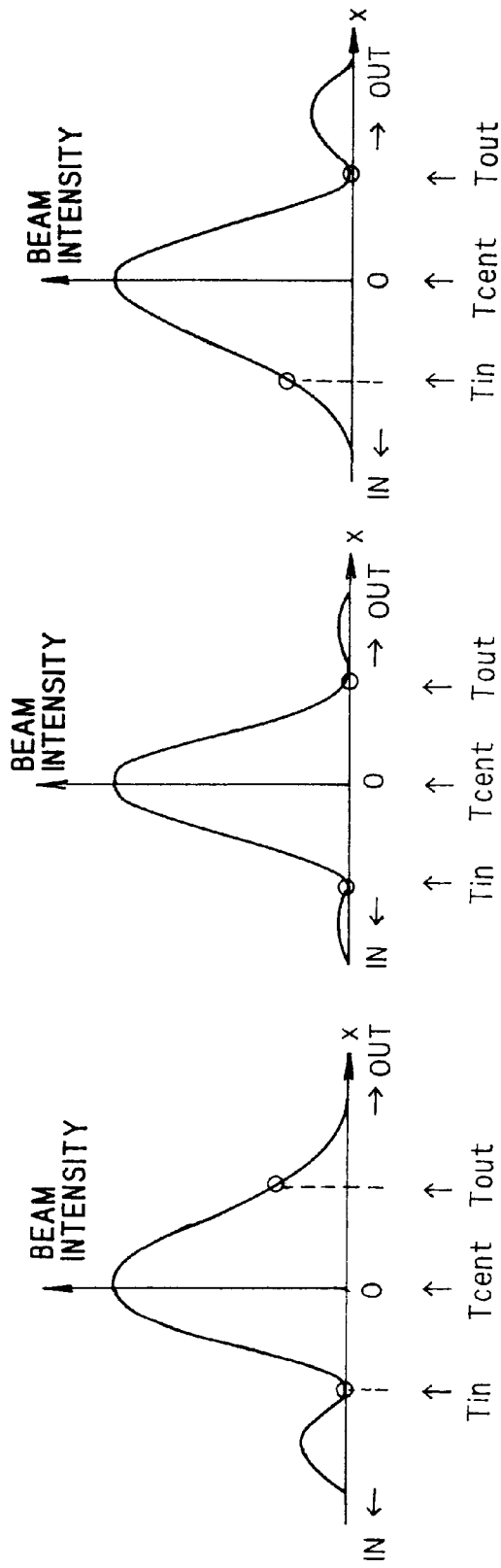

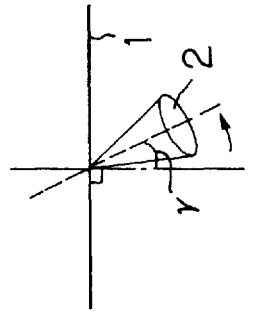
FIG. 7A
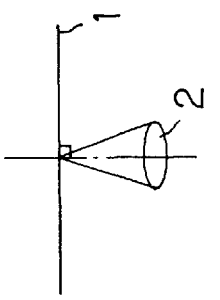
FIG. 7B
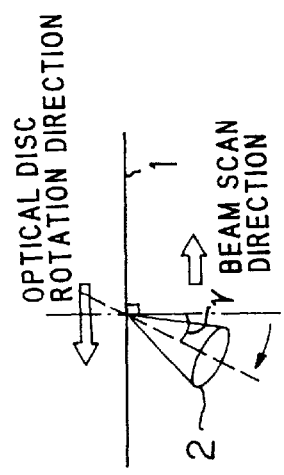
FIG. 7C
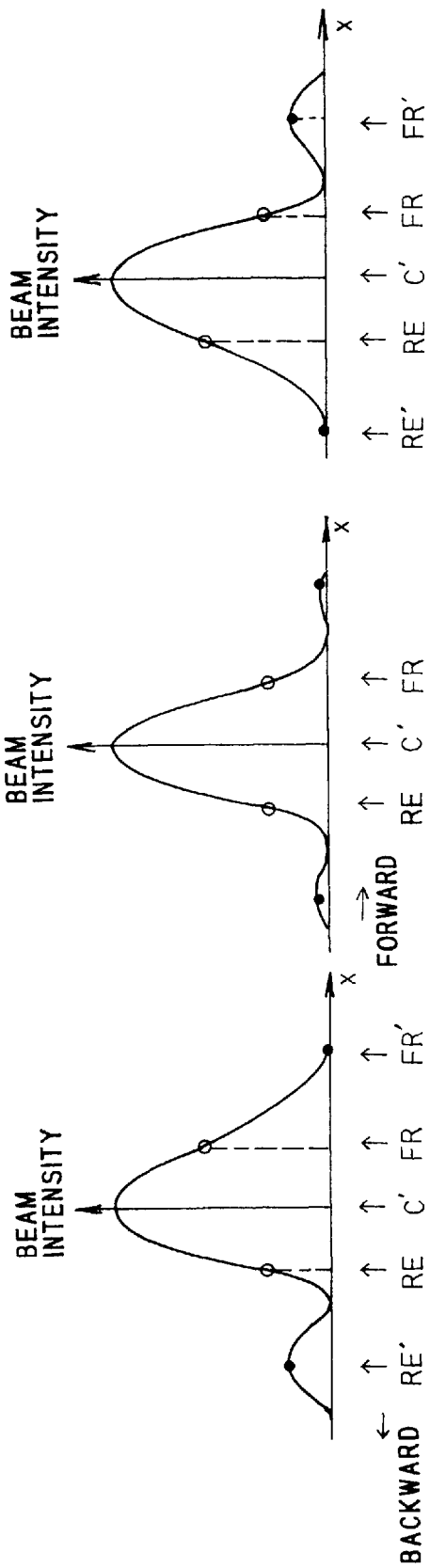

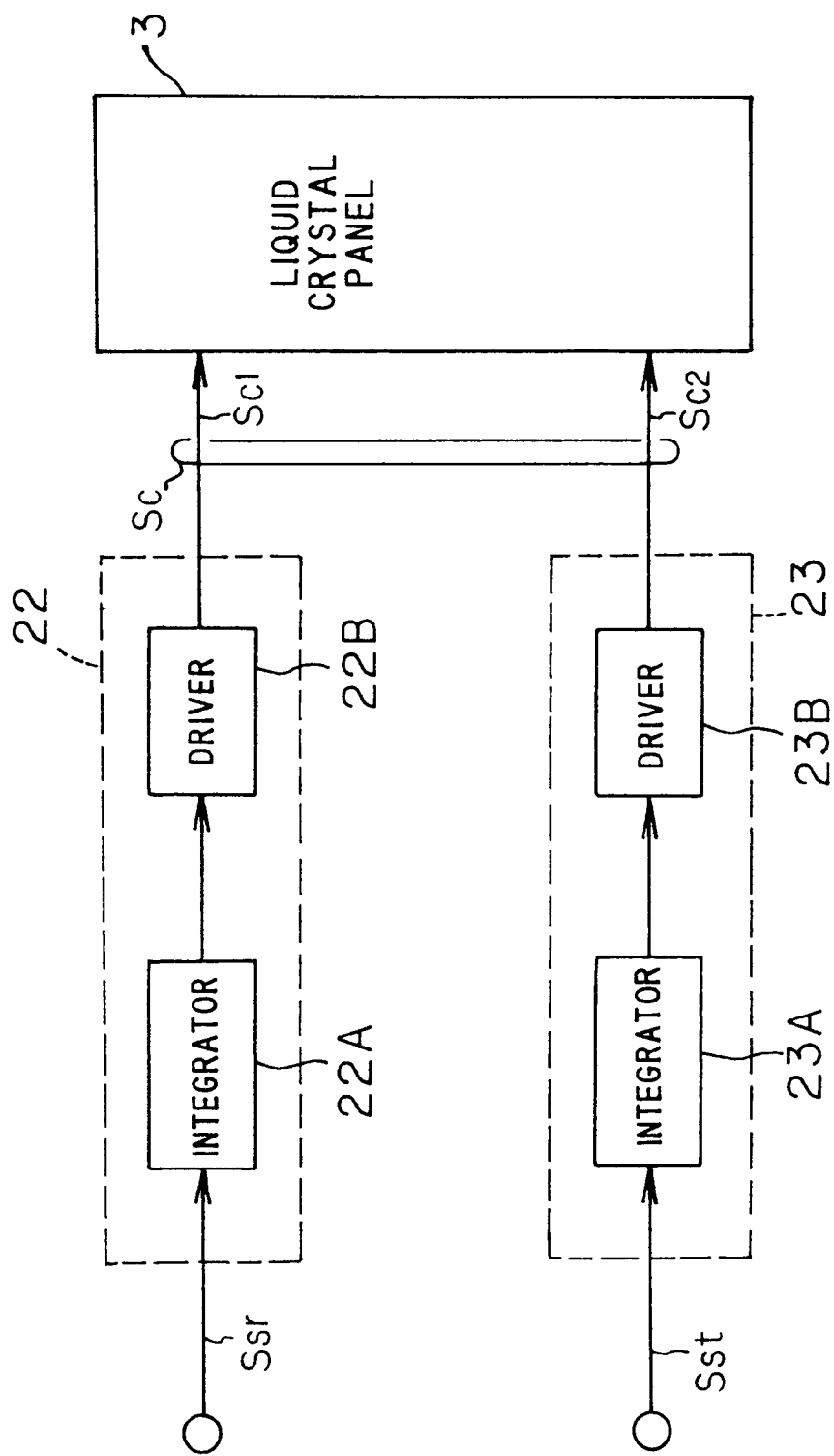

(b)

F : 225nm~275nm
E : 175nm~225nm
D : 125nm~175nm
C : 75nm~125nm
B : 25nm~75nm
A : -25nm~25nm
G : -75nm~-25nm
H : -125nm~-75nm
I : -175nm~-125nm
J : -225nm~-175nm
H : -275nm~-225nm

RMS VALUE OF WAVEFRONT ABERRATION

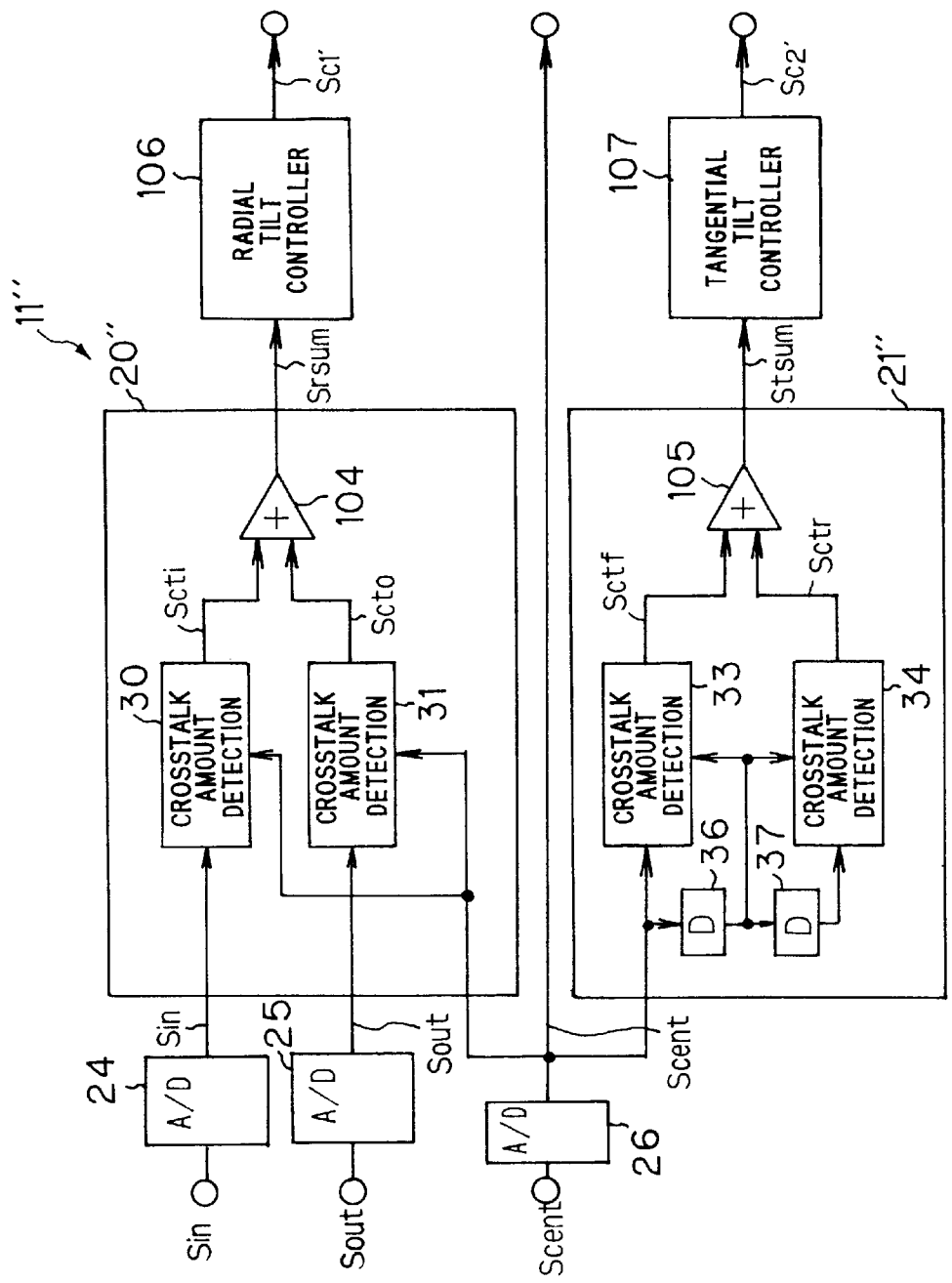

ABERRATION CORRECTING APPARATUS AND INFORMATION REPRODUCING APPARATUS HAVING THE SAME

BACKGROUND OF THE INVENTION

1. Field of the Invention

The present invention relates to a technical field of an aberration correcting apparatus for correcting a wavefront aberration (mainly a coma aberration) generated on an information recording surface of an information record medium for an optical information reproduction due to an inclination of an angle formed between the information recording surface and an optical axis of an optical beam for the information reproduction from the right angle. (Hereafter, this inclination is referred to as a tilt, and the amount of this inclination is referred to as a tilt amount.)

2. Description of the Related Art

In such an aberration correcting device, the wavefront aberration caused, for example, in the direction of a radius of an optical disc functioning as an information record medium (hereafter referred to as radial direction) due to the tilt is corrected by: emitting an optical beam for a tilt amount detection onto the optical disc besides the above described optical beam for the information reproduction; receiving the reflected light of the optical beam for the tilt amount detection by using a photodetector divided into two partial detection portions by a division line perpendicular to the radial direction (hereafter, the emitting device for emitting the optical beam for the tilt amount detection and the photodetector are referred to collectively as a tilt sensor); calculating the above described tilt amount from the difference between the detected signals supplied from the respective partial detection portions; and inclining the optical axis of the optical beam for the information reproduction so as to cancel the tilt on the basis of the calculated tilt amount.

In this aberration correcting apparatus, however, it is necessary to cancel the tilt by inclining the optical axis by using a mechanical drive device. Therefore, the aberration correcting apparatus has problems of an increased manufacturing cost, a lowered reliability and a difficulty in a size reduction. These problems occur for the tilt in the rotation direction of the optical disc (hereafter, which referred to as a tangential direction) as well in the same way.

Therefore, as an improvement of the above described mechanical aberration correcting apparatus, there is a method of giving a phase difference or the like to the optical beam for the information reproduction on the basis of the detected tilt amount without using the mechanical tilt canceling device, to thereby optically cancel the wavefront aberration caused by the tilt.

However, according to the above described method of optically canceling the aberration, the tilt itself is not canceled but the wavefront aberration caused by the tilt is canceled. Thus, even if the wavefront aberration is canceled, the tilt itself is not changed. As a result, the detected signal supplied from the tilt sensor is not changed, either.

Therefore, it cannot be determined from the detected signal supplied from the tilt sensor whether the optical correction is insufficient or superfluous. Unlike the above described mechanical aberration correcting apparatus, therefore, a so-called feedback control based on the detected signal of the tilt sensor cannot be conducted. Instead, a so-called feedforward control of estimating the wavefront aberration (i.e., the tilt amount) on the basis of the detected signal supplied from the tilt sensor and conducting the correction is thus execution.

Therefore, if the tilt amount cannot be detected accurately by the tilt sensor, the aberration correction cannot be conducted properly. Thus, there is a problem that the dispersion of sensitivities and offsets or nonlinear characteristics of the partial detection portions in the tilt sensor must be adjusted accurately.

Furthermore, there is a problem that a change is caused in some cases by an elapse of time even or aging even if these values are adjusted accurately in the initial state.

Furthermore, there is a problem that, in the case where both of the tilt in the radial tilt direction and the tilt in the tangential direction are to be corrected, two tilt sensors must be used resulting in a large sized pickup portion.

SUMMARY OF THE INVENTION

The present invention is made in view of the above described problems. It is therefore an object of the present invention to provide an aberration correcting apparatus, which has a high precision and a high reliability and which can be reduced in size without employing an additional separated sensor such as the above described tilt sensor, and an information reproducing apparatus having such an aberration correcting apparatus.

The above object of the present invention can be achieved by an aberration correcting apparatus provided with: a light detection device for irradiating an information record medium, on which record information is recorded, with a light beam, and outputting a light detection signal corresponding to the record information on the basis of a reflection light of the light beam reflected from the information record medium; a tilt detection device for detecting a tilt between an information record surface of the information record medium and an optical axis of the light beam on the basis of the light detection signal; a correction device for correcting a wavefront aberration generated in the light beam due to the tilt; and a driving device for driving the correction device on the basis of the detected tilt.

According to the aberration correcting apparatus, an information record medium is irradiated with the light beam by the light detection device, and the light detection signal corresponding to the record information is outputted on the basis of a reflection light. Then, on the basis of the light detection signal, the tilt between the information record surface of the information record medium and the optical axis of the light beam is detected by the tilt detection device. Then, the wavefront aberration generated in the light beam due to the tilt is corrected by the correction device. Finally, the corrected device is driven by the driving device on the basis of the detected tilt.

Accordingly, since the tilt is detected on the basis of the light detection signal obtained by the irradiation of the light beam for the information reproduction, it is not necessary to emit another light beam exclusive for the tilt detection besides the light beam for the information reproduction, so that the structure of the aberration correcting apparatus can be simplified.

Therefore, it is possible to correct the aberration due to the tilt of the optical axis of the light beam precisely by the structure which is simplified and is reduced in size.

In one aspect of the aberration correcting apparatus, the information record medium is provided with a disc type record medium on which the record information is recorded by forming a spiral or coaxial track. The light detection device outputs as the light detection signal a center detected signal corresponding to the record information forming a center turn of the track on which the record information to be reproduced is recorded, an inner detected signal corresponding to the record information forming an inner turn of the track located adjacent to the center turn at an inner side thereof and an outer detected signal corresponding to the record information forming an outer turn of the track located adjacent to the center turn at an outer side thereof. And that, the tilt detection device provided with at least one of (i) a tangential tilt detection device for detecting a tangential tilt, which is the tilt in a tangential direction of the track on the disc type record medium, on the basis of the center detected signal and (ii) a radial tilt detection device for detecting a radial tilt, which is the tilt in a radial direction of the track on the disc type record medium on the basis of the inner, center and outer detected signals.

According to this aspect, the center detected signal, the inner detected signal and the outer detected signal are outputted by the light detection device. Then, the tangential tilt is detected by the tangential tilt detection device on the basis of the center detected signal, or the radial tilt is detected by the radial tilt detection device on the basis of the inner, center and outer detected signals.

Thus, since the tilt in the radial direction is detected by use of the light detection signals from the adjacent turns of the track while the tilt in the tangential direction is detected by use of the light detection signal from the center turn of the track, it is possible to detect the tilt in the respective directions precisely so as to correct the wavefront aberration.

In this aspect, the radial tilt detection device may be provided with a crosstalk detection device for detecting (a) an inner crosstalk, which is a crosstalk from the inner detected signal to the center detected signal, and (b) an outer crosstalk, which is a crosstalk from the outer detected signal to the center detected signal, respectively, so as to detect the radial tilt as a difference between the detected inner crosstalk and the detected outer crosstalk. And that, the driving device may drive the correction device so that a value of the radial tilt is reduced to approach a zero.

Thus, the inner and outer crosstalks are detected by the crosstalk detection device, so that the radial tilt is detected as the difference between the detected inner and outer crosstalks. Then, the correction device is driven by the driving device so that the value of the radial tilt is reduced to approach a zero. Accordingly, since the wavefront aberration in the radial direction is corrected by reducing the difference of the inner and outer crosstalks, it is possible to precisely correct the wavefront aberration in the radial direction by use of a simple structure.

In this aspect also, the radial tilt detection device may be provided with a crosstalk detection device for detecting (a) an inner crosstalk, which is a crosstalk from (b) the inner detected signal to the center detected signal, and an outer crosstalk, which is a crosstalk from the outer detected signal to the center detected signal, respectively, so as to detect the radial tilt as a sum of the detected inner crosstalk and the detected outer crosstalk. And that, the driving device may drive the correction device so that a value of the radial tilt is reduced to a minimum.

Thus, the inner and outer crosstalks are detected by the crosstalk detection device, so that the radial tilt is detected as the sum of the detected inner and outer crosstalks. Then, the correction device is driven by the driving device so that the value of the radial tilt is reduced to a minimum. Accordingly, since the wavefront aberration in the radial direction is corrected by reducing the sum of the inner and outer crosstalks, it is possible to precisely correct the wavefront aberration in the radial direction by use of a simple structure.

In this aspect also, the tangential tilt detection device may be provided with a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a difference between the detected forward crosstalk and the detected backward crosstalk. And that, the driving device may drive the correction device so that a value of the tangential tilt is reduced to approach a zero.

Thus, the forward crosstalk and the backward crosstalk are detected by the crosstalk detection device respectively, and the tangential tilt is detected as the difference between the detected forward and backward crosstalks. Then, the correction device is driven by the driving device so that the value of the tangential tilt is reduced to approach a zero. Accordingly, since the wavefront aberration in the tangential direction is corrected by reducing the difference of the forward and backward crosstalks, it is possible to precisely correct the wavefront aberration in the tangential direction by use of a simple structure.

In this aspect also, the tangential tilt detection device may be provided with a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a sum of the detected forward crosstalk and the detected backward crosstalk. And that, the driving device may drive the correction device so that a value of the tangential tilt is reduced to a minimum.

Thus, the forward crosstalk and the backward crosstalk are detected by the crosstalk detection device respectively, and the tangential tilt is detected as the sum of the detected forward and backward crosstalks. Then, the correction device is driven by the driving device so that the value of the tangential tilt is reduced to a minimum. Accordingly, since the wavefront aberration in the tangential is corrected by reducing the sum of the forward and backward crosstalks, it is possible to precisely correct the wavefront aberration in the tangential direction by use of a simple structure.

In another aspect of the aberration correcting apparatus, the correction device is provided with a liquid crystal panel disposed in an optical path of the light beam for correcting the wavefront aberration.

According to this aspect, the wavefront aberration is corrected by the liquid crystal panel disposed in the optical path of the light beam. Thus, it is possible to construct the correcting device by employing a rather simple structure. Further, since no mechanical driving part is necessary in the correcting device, the reliability as the aberration correcting apparatus is improved, and the reduction in size is promoted.

In this aspect, the liquid crystal panel may be provided with: a liquid crystal for giving a phase difference to the light beam so as to correct the wavefront aberration; and an electrode for applying a voltage to the liquid crystal so as to give the phase difference to the light beam transmitted though the liquid crystal. And that, the driving device may be provided with a voltage applying device for applying the voltage to the electrode on the basis of the detected tilt.

Thus, the voltage is applied to the electrode by the voltage applying device, on the basis of the detected tilt. Then, the voltage is applied to the liquid crystal by the electrode. Then, the phase difference is given to the light beam transmitted through the liquid crystal, so that the wavefront aberration is corrected. Accordingly, it is possible to correct the wavefront aberration efficiently by giving the phase difference to the light beam.

In this case further, the electrode may be provided with a plurality of sub electrodes having a shape corresponding to a distribution of the wavefront aberration generated in the light beam in correspondence with the tilt, and the voltage applying device may individually apply the voltage to each of the sub electrodes.

Thus, the sub electrodes have the shape corresponding to the distribution of the wavefront aberration. Here, the voltage is individually applied to each of the sub electrodes by the voltage applying device. Accordingly, it is possible to correct the wavefront aberration efficiently by use of the sub electrodes in correspondence with the distribution of the wavefront aberration.

In another aspect of the aberration correcting apparatus, the correction device is provided with an inclination device for inclining the optical axis of the light beam on the basis of the detected tilt, so as to canceling the detected tilt.

According to this aspect, the optical axis of the light beam is inclined by the inclination device on the basis of the detected tilt, so that the detected tilt is canceled and thus the tilt is corrected. Accordingly, it is not necessary to emit another light beam exclusive for the tilt detection besides the light beam for the information reproduction, and it is possible to correct the wavefront aberration by canceling the inclination by use of a simple structure.

The above object of the present invention can be also achieved by an information reproducing apparatus provided with (I) the above described aberration correcting apparatus of the present invention, (II) a light collecting device for collecting the light beam onto the information record medium, and (III) a reproducing device for reproducing the record information on the basis of the light detection signal.

According to the information reproducing apparatus, while the wavefront aberration is corrected by the above described aberration correcting apparatus of the present invention, the light beam is collected or condensed onto the information record medium by the light collecting device, and the record information is reproduced by the reproducing device on the basis of the light detection signal. Therefore, it is possible to precisely reproduce the record information with correcting the wavefront aberration due to the tilt by use of the simple structure.

In one aspect of the information reproducing apparatus, the information record medium is provided with a disc type record medium on which the record information is recorded by forming a spiral or coaxial track. The light detection device outputs as the light detection signal a center detected signal corresponding to the record information forming a center turn of the track on which the record information to be reproduced is recorded, an inner detected signal corresponding to the record information forming an inner turn of the track located adjacent to the center turn at an inner side thereof and an outer detected signal corresponding to the record information forming an outer turn of the track located adjacent to the center turn at an outer side thereof. And that, the tilt detection device provided with at least one of (i) a tangential tilt detection device for detecting a tangential tilt, which is the tilt in a tangential direction of the track on the disc type record medium, on the basis of the center detected signal and (ii) a radial tilt detection device for detecting a radial tilt, which is the tilt in a radial direction of the track on the disc type record medium on the basis of the inner, center and outer detected signals.

According to this aspect, the center detected signal, the inner detected signal and the outer detected signal are outputted by the light detection device. Then, the tangential tilt is detected by the tangential tilt detection device on the basis of the center detected signal, or the radial tilt is detected by the radial tilt detection device on the basis of the inner, center and outer detected signals.

Thus, since the tilt in the radial direction is detected by use of the light detection signals from the adjacent turns of the track while the tilt in the tangential direction is detected by use of the light detection signal from the center turn of the track, it is possible to detect the tilt in the respective directions precisely so as to correct the wavefront aberration. Therefore, it is possible to precisely reproduce the record information with correcting the wavefront aberration in each of the radial direction and the tangential direction due to the tilt.

In this aspect, (I) the radial tilt detection device may be provided with a crosstalk detection device for detecting (a) an inner crosstalk, which is a crosstalk from the inner detected signal to the center detected signal, and (b) an outer crosstalk, which is a crosstalk from the outer detected signal to the center detected signal, respectively, so as to detect the radial tilt as a difference between the detected inner crosstalk and the detected outer crosstalk. The tangential tilt detection device may be provided with a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a difference between the detected forward crosstalk and the detected backward crosstalk. The driving device may drive the correction device so that each value of the radial tilt and the tangential tilt is reduced to approach a zero. And that, (II) the reproducing device may be provided with a subtracter device for subtracting the inner crosstalk, the outer crosstalk, the forward crosstalk and the backward crosstalk from the light detection signal to generate a subtracted light detection signal, and may reproduce the record information on the basis of the subtracted light detection signal.

Thus, the radial tilt is detected as the difference between the detected inner and outer crosstalks. On the other hand, the tangential tilt is detected as the difference between the detected forward and backward crosstalks. Then, while the correction device is driven by the driving device so that the value of each of the radial and tangential tilts is reduced to approach a zero, the inner crosstalk, the outer crosstalk, the forward crosstalk and the backward crosstalk are subtracted from the light detection signal by the subtracter device. Finally, on the basis of this subtracted light detection signal, the record information is reproduced. Accordingly, it is possible to precisely reproducing the record information by removing the crosstalks respectively while correcting the wavefront aberration due to the tile by use of a simple structure.

In this case also, (I) the radial tilt detection device may be provided with a crosstalk detection device for detecting (a) an inner crosstalk, which is a crosstalk from the inner detected signal to the center detected signal, and (b) an outer crosstalk, which is a crosstalk from the outer detected signal to the center detected signal, respectively, so as to detect the radial tilt as a sum of the detected inner crosstalk and the detected outer crosstalk. The tangential tilt detection device may be provided with a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a sum of the detected forward crosstalk and the detected backward crosstalk. The driving device may drive the correction device so that each value of the radial tilt and the tangential tilt is reduced to a minimum. And that, (II) the reproducing device may be provided with a subtracter device for subtracting the inner crosstalk, the outer crosstalk, the forward crosstalk and the backward crosstalk from the light detection signal to generate a subtracted light detection signal, and may reproduce the record information on the basis of the subtracted light detection signal.

Thus, the radial tilt is detected as the sum of the detected inner and outer crosstalks. On the other hand, the tangential tilt is detected as the sum of the detected forward and backward crosstalks. Then, while the correction device is driven by the driving device so that the value of each of the radial and tangential tilts is reduced to a minimum, the inner crosstalk, the outer crosstalk, the forward crosstalk and the backward crosstalk are subtracted from the light detection signal by the subtracter device. Finally, on the basis of this subtracted light detection signal, the record information is reproduced. Accordingly, it is possible to precisely reproducing the record information by removing the crosstalks respectively while correcting the wavefront aberration due to the tile by use of a simple structure.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3A is a diagram showing a principle of a radial tilt detection when a tilt is generated inward;

FIG. 3B is a diagram showing a principle of a radial tilt detection when a tilt is not generated;

FIG. 3C is a diagram showing a principle of a radial tilt detection when a tilt is generated outward;

FIG. 7A is a diagram showing a principle of the tangential tilt detection when a tilt is generated forward;

FIG. 7B is a diagram showing a principle of the tangential tilt detection when a tilt is not generated;

FIG. 7C is a diagram showing a principle of the tangential tilt detection when a tilt is generated backward;

FIG. 9 is a block diagram showing a schematic configuration of a radial tilt controller and a tangential tilt controller of the first embodiment;

FIG. 19 is a block diagram showing a schematic configuration of a signal process unit of a fourth embodiment;

DETAILED DESCRIPTION OF THE PREFERRED EMBODIMENTS

Figure 1:
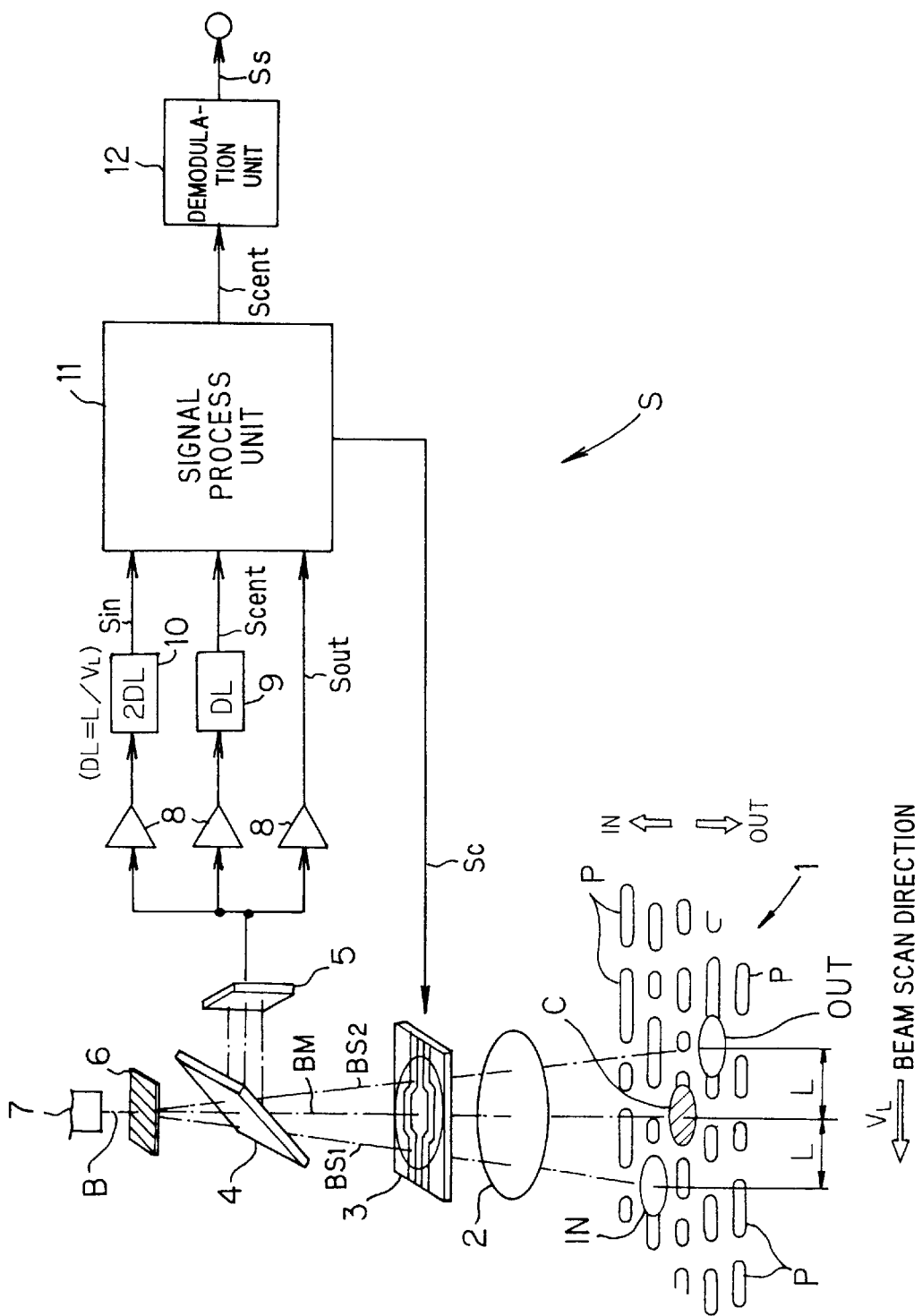
FIG. 1 is a block diagram showing a schematic configuration of an information reproducing apparatus as an first embodiment of the present invention.

Preferred embodiments of the present invention will now be described by referring to the drawing.

The embodiments described hereafter are embodiments in the case where the present invention is applied to an information reproducing apparatus for reproducing record information from an optical disc as one example of a disc-like recording medium on which the record information is recorded by forming concentrically circular or spiral tracks of pits corresponding to the record information.

(I) First Embodiment

First of all, a first embodiment of the present invention will now be described by referring to FIGS. 1 to 13.

The entire configuration of an information reproducing apparatus of the first embodiment will first be described by referring to FIG. 1.

As shown in FIG. 1, an information reproducing apparatus S of the first embodiment includes: a laser diode 7; a diffraction grating 6; a beam splitter 4; a liquid crystal panel 3 serving as one example of a correction device; an objective lens 2 serving as one example of a condenser device; a detector 5 serving as one example of a detection device; three amplifiers 8; delay circuits 9 and 10; a signal process unit 11 serving as one example of a tilt detection device, a voltage applying device and a driving device; and a demodulation unit 12 serving as one example of a reproducing device.

Operations of respective units will now be described. Incidentally, as shown in FIG. 1, record information recorded on an optical disc 1 is recorded on tracks formed of pits P, which have a plurality of kinds of length corresponding to the record information and are arranged in columns in a longitudinal direction. The rotation velocity of the optical disc 1 in the tangential direction (i.e., the beam scan direction) is represented by $V_L$.

The laser diode 7 emits an optical beam B which is a laser light.

The diffraction grating 6 separates the optical beam B into a main beam BM and a first subsidiary beam $BS_1$ and a second subsidiary beam $BS_2$.

The beam splitter 4 transmits a part of each of the main beam BM, the first subsidiary beam $BS_1$ and the second subsidiary beam $BS_2$ so as to make it arrive at the liquid crystal panel 3.

At this time, the liquid crystal panel 3 give a phase difference to each of the main beam BM, the first subsidiary beam $BS_1$ and the second subsidiary beam $BS_2$ on the basis of a tilt correction control signal Sc supplied from the signal process unit 11, to thereby correct a wavefront aberration caused by a tilt occurring in the optical disc 1.

The objective lens 2 applies the main beam BM, the first subsidiary beam $BS_1$ and the second subsidiary beam $BS_2$ each provided with the phase difference on to the optical disc 1. Here, the main beam BM is applied to a track having the record information to be reproduced recorded thereon (hereafter referred to a reproduction track). On the reproduction track, a central optical spot C is thus formed. The first subsidiary beam $BS_1$ is applied to a track located one track inner than the reproduction track (hereafter referred to as an inner track). An inner optical spot IN is thus formed on the inner track. The second subsidiary beam $BS_2$ is applied to a track located one track outer than the reproduction track (hereafter referred to as an outer track). An outer optical spot OUT is thus formed on the outer track.

Thereafter, the main beam BM, the first subsidiary beam $BS_1$ and the second subsidiary beam $BS_2$ applied onto the respective tracks are intensity-modulated by the pits P located on the respective tracks. Due to the reflection at the optical disc 1, the plane of polarization of each beam is rotated. The main beam BM, the first subsidiary beam $BS_1$ and the second subsidiary beam $BS_2$ arrive at the beam splitter 4 again through the objective lens 2 and the liquid crystal panel 3, and are reflected toward a light receiving surface of the detector 5 by the beam splitter 4.

Next, the main beam BM, the first subsidiary beam $BS_1$ and the second subsidiary beam $BS_2$ received by the detector 5 are converted to electric signals respectively separately, are outputted to the amplifiers 8 respectively separately as a central detected signal Scent corresponding to the central beam BM, an inner detected signal Sin corresponding to the first subsidiary beam $BS_1$, and an outer detected signal Sout corresponding to the second subsidiary beam $BS_2$, and are amplified respectively.

Among these detected signals amplified by the amplifiers 8, the outer detected signal Sout is outputted to the signal process unit 11 as it is.

On the other hand, the amplified central detected signal Scent is outputted to the signal process unit 11 after being delayed with a delay amount DL by the delay circuit 9.

Furthermore, the amplified inner detected signal Sin is outputted to the signal process unit 11 after being delayed with a delay amount 2×DL by the delay circuit 10.

The delay amount DL (or 2×DL) in the delay circuits 9 and 10 is set according to the following equation:

$$DL=L/V_L$$

wherein L represents a distance between the inner optical spot IN and the central optical spot C and also between the central optical spot C and the outer optical spot OUT measured along the tracks of the optical disc 1.

The reason why the delay circuits 9 and 10 are provided in the information reproducing apparatus S are as following.

Namely, in the signal process unit 11, a crosstalk caused on the central detected signal Scent by the inner detected signal Sin and a crosstalk caused on the central detected signal Scent by the outer detected signal Sout are derived on the basis of the inner detected signal Sin, the central detected signal Scent, and the outer detected signal Sout, so that the tilt correction control signal Sc is generated as described later. At this time, the respective detected signals Sin, Scent and Sout must be generated on the basis of the inner optical spot IN, the central optical spot C, and the outer optical spot OUT lining up on a straight line in the radial direction of the optical disc 1. However, in fact, in the case where the optical beam B is separated by using the diffraction grating 6 in the actual information reproducing apparatus S, it is difficult to line up the optical spots IN, C and OUT on a straight line in the radial direction of the optical disc 1. In the information reproducing apparatus S, therefore, the inner detected signal Sin generated from the preceding inner optical spot IN is delayed with the delay amount 2×DL, and the central detected signal Scent generated from the central optical spot C is delayed with the delay amount DL. At the time point when the outer detected signal Sout is generated from the outer optical spot OUT, therefore, three detected signals Sin, Scent and Sout are simultaneously outputted to the signal process unit 11. Since the optical disc 1 itself is moving at the velocity of $V_L$ even during the time duration of this delay process, the respective detected signals based upon the pits P located in positions lined up on a straight line in the radial direction of the optical disc 1 are eventually inputted to the signal process unit 11 at the same time, resulting in that the above described crosstalk amounts are detected accurately.

On the basis of these inputted inner detected signal Sin, central detected signal Scent and outer detected signal Sout, the signal process unit 11 generates the tilt correction control signal Sc by conducting processing described later and outputs it to the liquid crystal panel 3. As a result, the liquid crystal panel 3 gives the phase difference to each optical beam to thereby correct the wavefront aberration caused on the optical disc 1 by the tilt.

On the other hand, the signal process unit 11 outputs the central detected signal Scent to the demodulation unit 12 as it is, in parallel with the generation of the tilt correction signal Sc.

The demodulation unit 12 demodulates the central detected signal Scent, and generates a reproduced signal Ss corresponding to the record information on the optical disc 1 to be reproduced.

Figure 2:
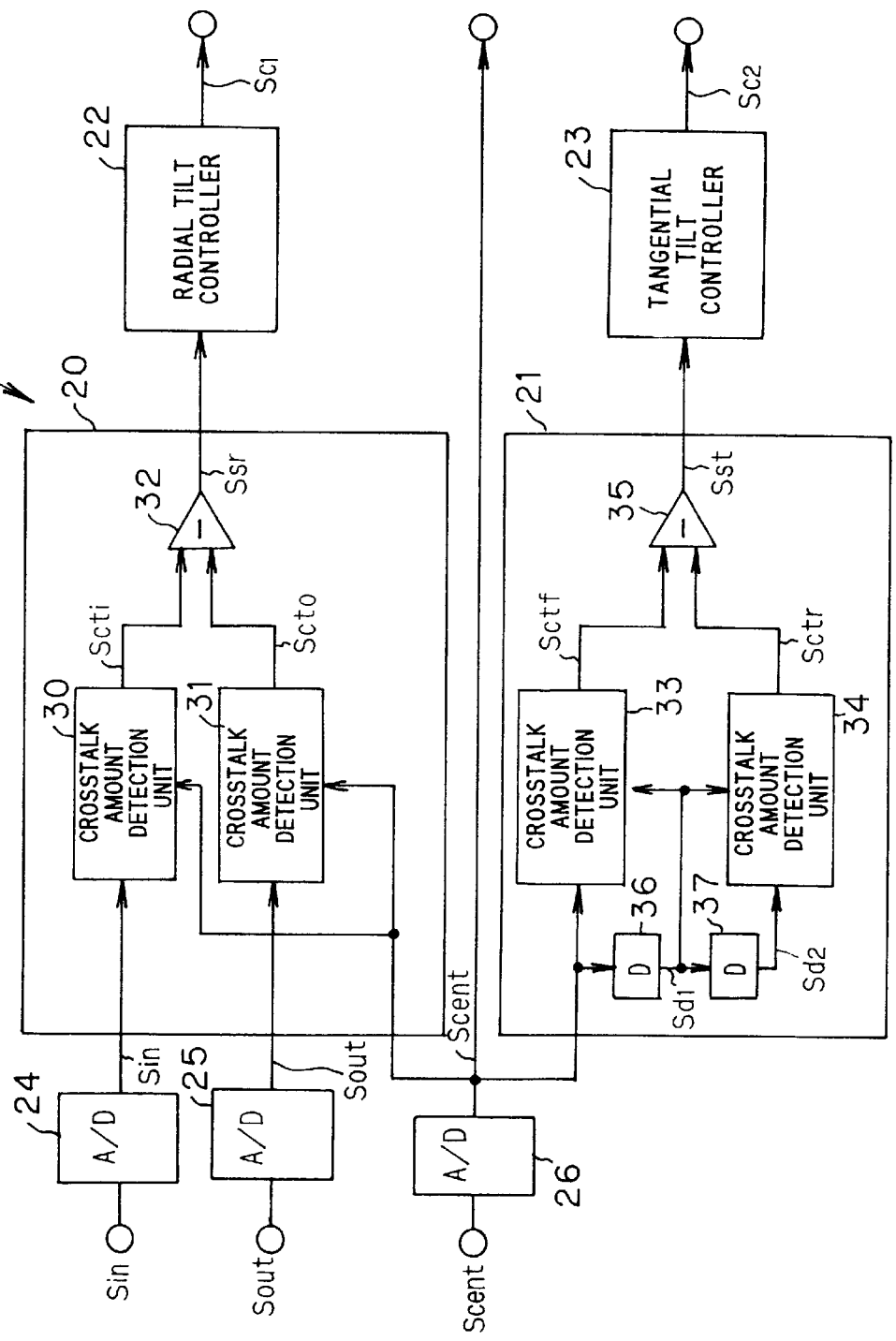
FIG. 2 is a block diagram showing a schematic configuration of a signal process unit of the first embodiment.

Next, the configuration of the signal process unit 11 is described by referring to FIG. 2.

As shown in FIG. 2, the signal process unit 11 includes: A/D converters 24, 25 and 26; a radial tilt detector 20 serving as one example of a radial tilt detection device; a tangential tilt detector 21 serving as one example of a tangential tilt detection device; a radial tilt controller 22; and a tangential tilt controller 23.

On the other hand, the radial tilt detector 20 includes: crosstalk amount detection units 30 and 31; and a subtracter 32.

Furthermore, the tangential tilt detector 21 includes: crosstalk amount detection units 33 and 34; a subtracter 35; and delay circuits 36 and 37.

Next, the operations of the respective components is described.

The A/D converter 26 converts the central detected signal Scent outputted from the delay circuit 9 to a digital signal, and outputs the digital signal to the demodulation unit 12 and the crosstalk amount detection units 30, 31 and 33.

On the other hand, the A/D converter 24 converts the inner detected signal Sin outputted from the delay circuit 10 to a digital signal, and outputs the digital signal to the crosstalk amount detection unit 30.

Furthermore, the A/D converter 25 converts the outer detected signal Sout outputted from the amplifier 8 to a digital signal, and outputs the digital signal to the crosstalk amount detection unit 31.

Then, by using these inputted inner detected signal Sin and central detected signal Scent, the crosstalk amount detection unit 30 detects a crosstalk amount caused on the central detected signal Scent by the inner detected signal Sin (hereafter referred to as an inner crosstalk amount). The crosstalk amount detection unit 30 outputs the inner crosstalk amount to the subtracter 32 as an inner crosstalk signal Scti.

On the other hand, by using these inputted outer detected signal Sout and central detected signal Scent, the crosstalk amount detection unit 31 detects a crosstalk amount caused on the central detected signal Scent by the outer detected signal Sout (hereafter referred to as an outer crosstalk amount). The crosstalk amount detection unit 31 outputs the outer crosstalk amount to the subtracter 32 as an outer crosstalk signal Scto.

As a result, the subtracter 32 calculates a difference between the inner crosstalk signal Scti and the outer crosstalk signal Scto on the basis of a detection principle described later, generates a difference signal Ssr, and outputs it to the radial tilt controller 22. This difference signal Ssr becomes a signal indicating the tilt amount of the radial direction (details will be described later).

Upon being supplied with the difference signal Ssr, the radial tilt controller 22 generates a tilt correction control signal $Sc_1$ for driving the liquid crystal panel 3 to correct the radial tilt on the basis of the difference signal Ssr, and applies the tilt correction control signal $Sc_1$ to an electrode of the liquid crystal panel 3 for the radial tilt correction described later.

On the other hand, the central detected signal Scent inputted to the tangential tilt detector 21 is delayed with delay amounts described later, in the delay circuits 36 and 37, and the delayed signals are outputted respectively as delayed signals $Sd_1$ and $Sd_2$. The central detected signal Scent and the delayed signal $Sd_1$ are inputted to the crosstalk amount detection unit 33. The delayed signals $Sd_1$ and $Sd_2$ are inputted to the crosstalk amount detection unit 34.

Thereafter, the delayed signal $Sd_1$, the delayed signal $Sd_2$, and the central detected signal Scent are treated as follows in the tangential tilt detector 21. Namely, information contained in the delayed signal $Sd_2$ is treated as information corresponding to information obtained from a position located backward in time on a certain track of the optical disc 1. Information contained in the delayed signal $Sd_1$ is treated as information corresponding to information obtained from a position located centrally in time on the certain track of the optical disc 1. Information contained in the central detected signal Scent is treated as information corresponding to information obtained from a position located forward in time on the certain track of the optical disc 1. By using the delayed signal $Sd_1$, the delayed signal $Sd_2$, and the central detected signal Scent, the tangential tilt detector 21 calculates a crosstalk amount caused on the central position by a position located forward and a crosstalk amount caused on the central position by a position located backward.

In other words, the crosstalk amount detection unit 33 detects a crosstalk amount caused on the delayed signal $Sd_1$ by the central detected signal Scent (i.e., the crosstalk amount caused on the central position by the position located forward on the same track, which is hereafter referred to as a front crosstalk amount). The crosstalk amount detection unit 33 outputs the detected crosstalk amount to the subtracter 35 as a front crosstalk signal Sctf.

On the other hand, the crosstalk amount detection unit 34 detects a crosstalk amount caused on the delayed signal $Sd_1$ by the delayed signal $Sd_2$ (i.e., the crosstalk amount caused on the central position by the position located backward on the same track, which is hereafter referred to as a rear crosstalk amount). The crosstalk amount detection unit 34 outputs the detected crosstalk amount to the subtracter 35 as a rear crosstalk signal Sctr.

As a result, the subtracter 35 calculates a difference between the front crosstalk signal Sctf and the rear crosstalk signal Sctr on the basis of a detection principle described later, generates a difference signal Sst, and outputs it to the tangential tilt controller 23. This difference signal Sst becomes a signal indicating the tilt amount of the tangential direction (details will be described later).

Upon being supplied with the difference signal Sst, the tangential tilt controller 23 generates a tilt correction control signal $Sc_2$ for driving the liquid crystal panel 3 to correct the tangential tilt on the basis of the difference signal Sst, and applies the tilt correction control signal $Sc_2$ to an electrode of the liquid crystal panel 3 for the tangential tilt correction described later.

Incidentally, a combination of the tilt correction control signal $Sc_1$ and the tilt correction control signal $Sc_2$ shown in FIG. 2 corresponds to the tilt correction control signal Sc shown in FIG. 1.

Next, the operation of the radial tilt detection unit 20 will now be described by referring to FIGS. 3 to 5.

First of all, a principle of the tilt amount detection in the radial direction in the present embodiment is described by referring to FIGS. 3A and 3B.

When there is no tilt in the radial direction, the optical axis of the optical beam BM emitted through the objective lens 2 is perpendicular to an information recording surface of the optical disc 1 as shown in an upper part of FIG. 3B. (In the following description, the optical beams BM, $BS_1$ and $BS_2$ are represented by the optical beam BM.) Therefore, the shape of the central optical spot C itself becomes nearly a true circle. Thus, as shown in a lower part of FIG. 3B, a beam profile (i.e., an intensity distribution of the optical beam BM on the optical disc 1) also becomes symmetrical laterally in the radial direction with respect to the central track to which the optical beam BM is applied. Therefore, the inner crosstalk amount on the central track is equal to the outer crosstalk amount on the central track. In this case, therefore, the difference between the two crosstalk amounts becomes zero.

On the other hand, in the case where the optical axis of the optical beam BM is deviated by an angle θ in the direction to the inner track as shown in FIG. 3A, the central optical spot C has a shape widened in the direction to the outer track which is opposite to the direction of the inclination of the optical axis. Thus, as shown in a lower part of FIG. 3A, the beam profile also has a stronger beam intensity in the direction to the outer track, and the beam profile does not become symmetrical laterally in the radial direction about the central track. Therefore, the outer crosstalk amount on the central track becomes larger than the inner crosstalk amount on the central track. In this case, therefore, the difference between the two crosstalk amounts does not become zero. For example, the value obtained by subtracting the outer crosstalk amount from the inner crosstalk amount becomes a negative value.

In contrast, in the case where the optical axis of the optical beam BM is deviated by an angle θ in the direction to the outer track as shown in FIG. 3C, the central optical spot C has a shape widened in the direction to the inner track. Thus, as shown in a lower part of FIG. 3C, the beam profile also has a stronger beam intensity in the direction to the inner track, and the beam profile does not become symmetrical laterally in the radial direction with respect to the central track. In the case of FIG. 3C, therefore, the inner crosstalk amount on the central track becomes larger than the outer crosstalk amount on the central track. In this case as well, therefore, the difference between the two crosstalk amounts does not become zero. For example, the value obtained by subtracting the outer crosstalk amount from the inner crosstalk amount becomes a positive value.

By deriving the difference between the inner crosstalk amount and the outer crosstalk amount, the direction of the tilt with respect to the radial direction is found based upon whether the difference is positive or negative and the tilt amount is found from the amount of the difference, as evident from the foregoing description. Furthermore, by driving the liquid crystal panel 3 so as to make the difference equal to zero, the wavefront aberration caused by the tilt in the radial direction can be corrected.

Next, the configurations of the crosstalk amount detection units 30 and 31, and concrete crosstalk amount detection operation will now be described by referring to FIGS. 4 and 5.

Figure 4:
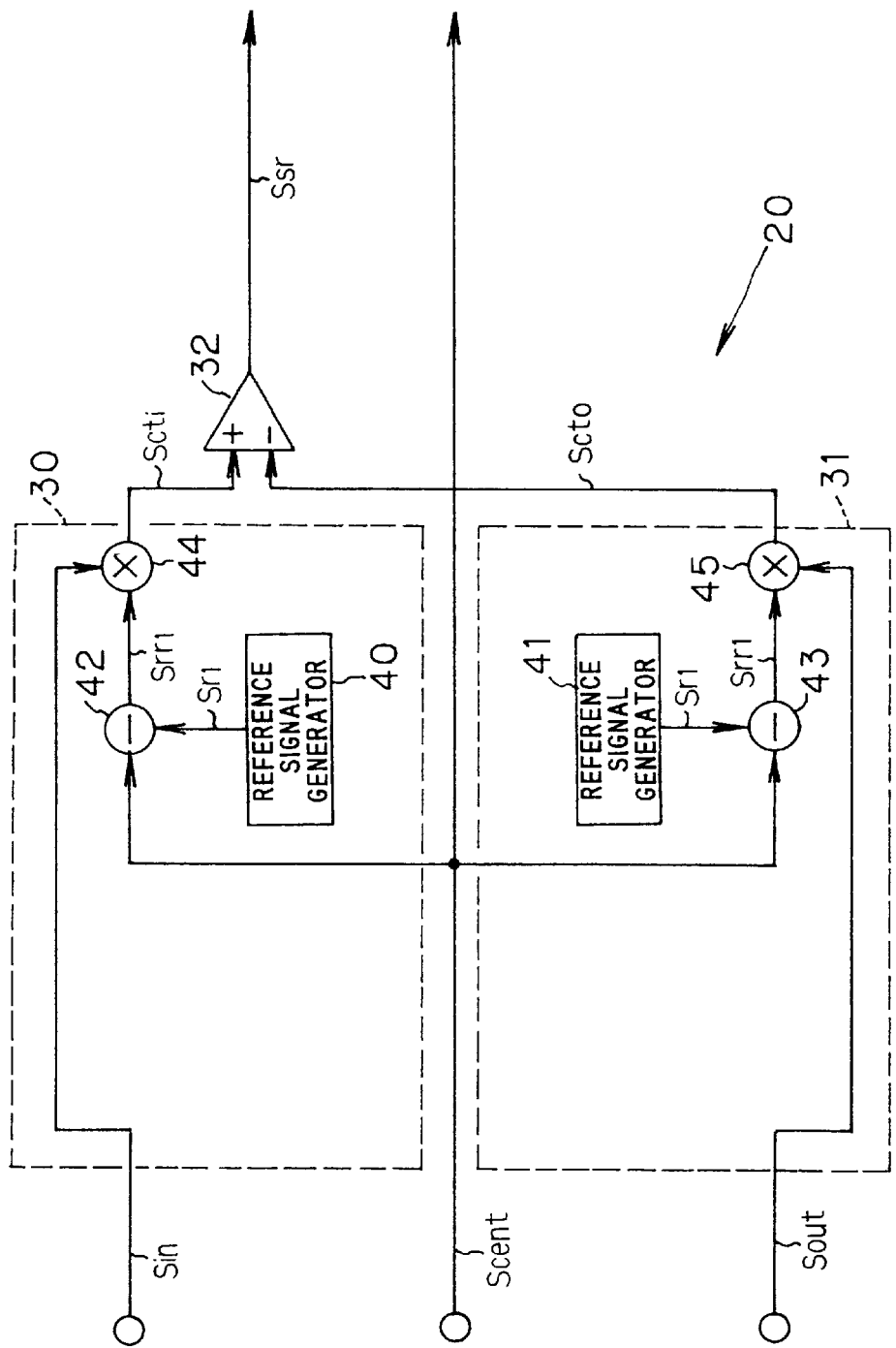
FIG. 4 is a block diagram showing a schematic configuration of a radial tilt detector of the first embodiment.

As shown in FIG. 4, the crosstalk amount detection unit 30 includes: a reference signal generator 40; a subtracter 42; and a multiplier 44.

Furthermore, the crosstalk amount detection unit 31 includes: a reference signal generator 41; a subtracter 43; and a multiplier 44.

Next, the operation will now be described by referring to FIGS. 4 and 5. By conducting the same operation, the crosstalk amount detection unit 30 and the crosstalk amount detection unit 31 detect the inner crosstalk amount or the outer crosstalk amount, and output the inner crosstalk signal Scti or the outer crosstalk signal Scto. In the ensuing description, therefore, the operation will be described by taking the crosstalk amount detection unit 30 as a representative one.

First of all, as a premise, the detection of the inner crosstalk amount in the crosstalk amount detection unit 30 is executed when the optical beam BM is applied to a reference region, which is formed on the optical disc 1 in advance. In the reference region, the pits corresponding to the original record information to be reproduced are not formed in advance, but preset pits such as a plurality of pits having a fixed length are formed so as to be contiguous at fixed intervals.

Figure 5:
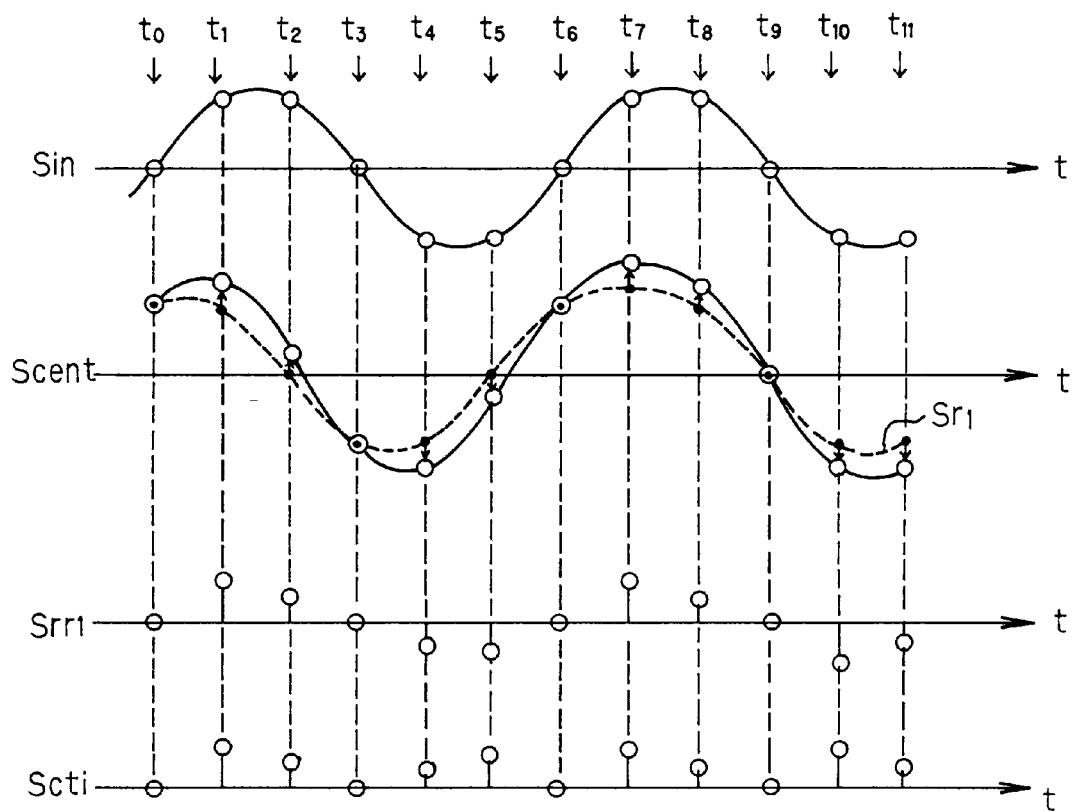
FIG. 5 is a timing chart showing an operation of the crosstalk amount detection unit of the first embodiment.

First of all, the reference signal generator 40 generates a reference signal $Sr_1$ (which is represented by a broken line waveform shown in a second uppermost stage of FIG. 5) having the same waveform as that of the central detected signal Scent which is supposed to be obtained when the optical beam BM is applied to the reference region in such a state that there is no crosstalk at all (i.e., the central detected signal Scent having an ideal waveform). The reference signal generator 40 then outputs the reference signal $Sr_1$ to the subtracter 42.

Subsequently, the subtracter 42 subtracts the reference signal $Sr_1$ from the central detected signal Scent which is being inputted (which is represented by a solid line waveform shown in a second uppermost stage of FIG. 5), thus generates an error signal $Srr_1$ (shown in a third uppermost stage of FIG. 5), and outputs the error signal $Srr_1$ to the multiplier 44. This error signal $Srr_1$ indicates the value of each sample of the crosstalk amount included in the central detected signal Scent.

Subsequently, the multiplier 44 multiplies the generated error signal $Srr_1$ by the inner detected signal Sin which is being inputted, and thereby generates the inner crosstalk signal Scti (shown in a lowermost stage of FIG. 5). The process conducted in the multiplier 44 is a process for extracting only the inner crosstalk amount caused by the inner detected signal Sin out of the error (the inner crosstalk or the outer crosstalk) included in the error signal $Srr_1$ and generating the inner crosstalk as the inner crosstalk signal Scti.

The inner crosstalk signal Scti outputted from the crosstalk amount detection unit 30 by the above described operation and the outer crosstalk signal Scto outputted from the crosstalk amount detection unit 31 by the same operation are inputted to the subtracter 32. Then, in accordance with the above described principle, the outer crosstalk signal Scto is subtracted from the inner crosstalk signal Scti. The difference signal Ssr indicating the tilt amount of the radial direction is thus generated.

By referring to FIGS. 6A to 8, the operation of the tangential tilt detection unit 21 will now be described.

First, the principle of the tilt amount detection in the tangential direction in the present embodiment will now be described by referring to FIGS. 6A to 7C.

Figure 6A:
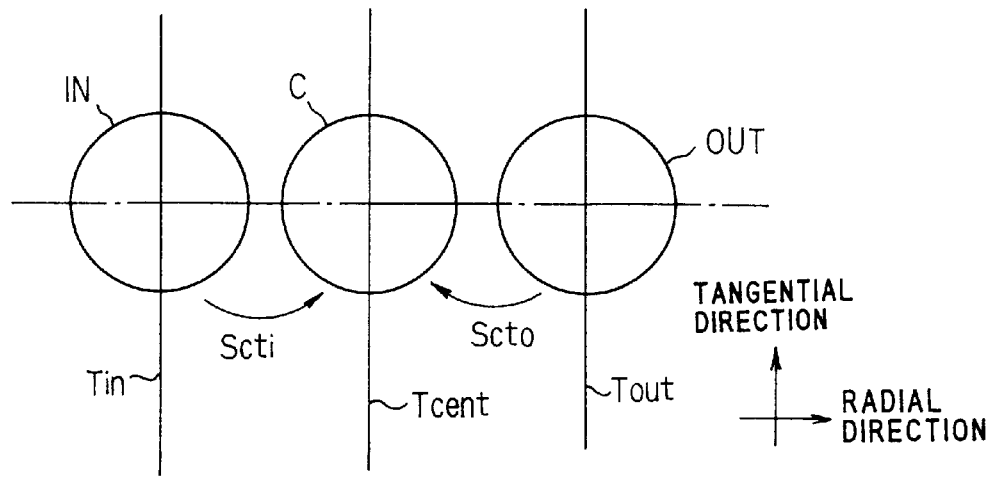
FIG. 6A is a diagram showing a principle of the radial tilt detection for comparison.

As shown in FIG. 6A, the above described radial tilt detector 20 detects the tilt amount of the radial direction from (i) the inner crosstalk signal Scti indicating the inner crosstalk amount caused on the central optical spot C by the inner optical spot IN and (ii) the outer crosstalk signal Scto indicating the outer crosstalk amount caused on the central optical spot C by the outer optical spot OUT.

Figure 6B:
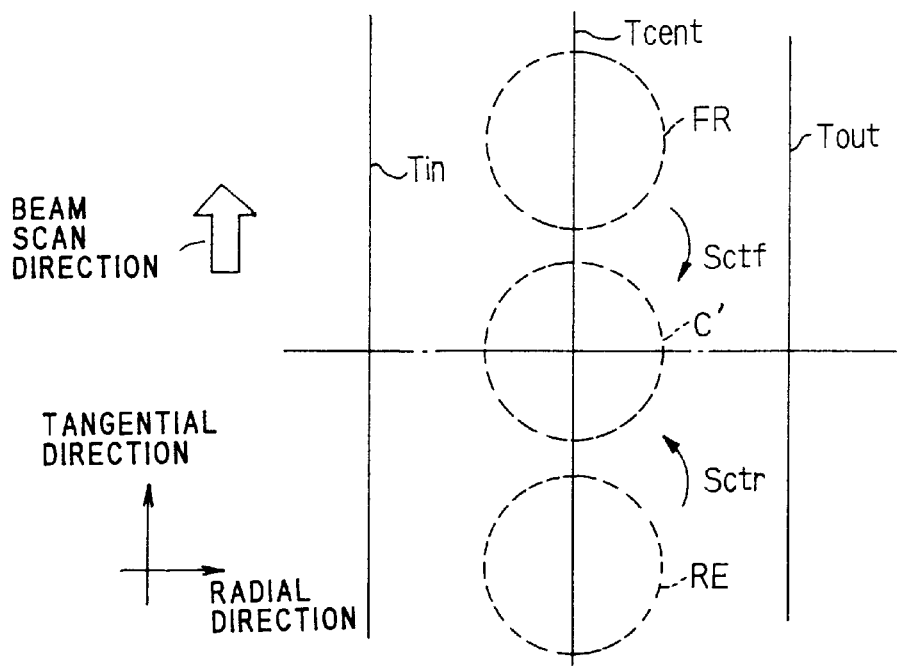
FIG. 6B is a diagram showing a principle of a tangential tilt detection in the first embodiment.

By diverting this method, the tangential tilt detector 21 described hereafter virtually forms a front optical spot FR, a rear optical spot RE, and a central optical spot C' on three different positions on the same central track Tcent as shown in FIG. 6B. By using the detected signals from these three optical spots (detected signals form three preceding and subsequent positions on the central track Tcent), the tangential tilt detector 21 detects the tilt amount of the tangential direction in accordance with the same principle as that of the radial tilt detector 20.

As for detected signals from the above described virtual front optical spot FR, rear optical spot RE, and central optical spot C', the actual tangential tilt detector 21 regards the central detected signal Scent itself as the detected signal obtained from the front optical spot FR, regards the delayed signal $Sd_1$ obtained by delaying the central detected signal Scent as the detected signal from the central optical spot C', and regards the delayed signal $Sd_2$ obtained by further delaying the delayed signal as the detected signal from the rear optical spot RE.

Next, the concrete principle of the tangential tilt detection is described by referring to FIGS. 7A to 7C.

When there is no tilt in the tangential direction, the optical axis of the optical beam BM emitted from the objective lens 2 is perpendicular to an information recording surface of the optical disc 1 as shown in an upper part of FIG. 7B. Therefore, the shape of the central optical spot C' itself becomes nearly a true circle. As shown in a lower part of FIG. 7B, the beam profile (i.e., an intensity distribution of the optical beam BM on the optical disc 1) also becomes symmetrical longitudinally in the tangential direction with respect to the central track Tcent to which the optical beam BM is applied. Therefore, the front crosstalk amount on the central track Tcent is equal to the rear crosstalk amount on the central track Tcent. In this case, therefore, the difference between the two crosstalk amounts becomes zero.

On the other hand, in the case where the optical axis of the optical beam BM is deviated by an angle γ in a direction opposite to the beam scan direction of the optical beam BM as shown in FIG. 7A, the central optical spot C' has a shape widened forward in the scan direction of the optical beam BM which is opposite to the direction of the inclination of the optical axis. As shown in a lower part of FIG. 7A, therefore, the beam profile also has a stronger beam intensity forward in the scan direction of the optical beam BM, and the beam profile does not become symmetrical longitudinally in the tangential direction of the central track Tcent. Therefore, the front crosstalk amount becomes larger than the rear crosstalk amount. In this case, therefore, the difference between the two crosstalk amounts does not become zero. For example, the value obtained by subtracting the rear crosstalk amount from the front crosstalk amount becomes a positive value.

In contrast, in the case where the optical axis of the optical beam BM is deviated by an angle γ in the same direction as the beam scan direction as shown in FIG. 7C, the central optical spot C' has a shape widened backward in the beam scan direction of the optical beam BM. As shown in a lower part of FIG. 7C, therefore, the beam profile also has a stronger beam intensity backward in the scan direction of the optical beam BM, and the beam profile does not become symmetrical longitudinally in the tangential direction of the central track Tcent. Therefore, the front crosstalk amount becomes smaller than the rear crosstalk amount. In this case, therefore, the value obtained by subtracting the rear crosstalk amount from the front crosstalk amount becomes a negative value.

By deriving the difference between the front crosstalk amount and the rear crosstalk amount, the direction of the tilt (forward or backward) with respect to the tangential direction is found based upon whether the difference is positive or negative and the tilt amount is found from the amount of the difference, as evident from the foregoing description. Furthermore, by driving the liquid crystal panel 3 so as to make the difference equal to zero, the wavefront aberration caused by the tilt in the tangential direction can be corrected.

Comparing the case where the delay amounts in the delay circuits 36 and 37 (which typically have the same delay amount) are small (as represented by white circles in FIGS. 7A to 7C) with the case where the delay amounts are large (as represented by black circles in FIGS. 7A to 7C), the following is found. Namely, in the case where the delay amount is small, the front crosstalk amount becomes larger than the rear crosstalk amount when the optical axis of the optical beam BM is deviated in a direction opposite to the scan direction of the optical beam BM (as shown in FIG. 7A), whereas the front crosstalk amount becomes smaller than the rear crosstalk amount when the optical axis of the optical beam BM is deviated in the same direction as the scan direction of the optical beam BM (as shown in FIG. 7C).

On the other hand, in the case where the delay amount is large, the front crosstalk amount becomes smaller than the rear crosstalk amount when the optical axis of the optical beam BM is deviated in a direction opposite to the scan direction of the optical beam BM, whereas the front crosstalk amount becomes larger than the rear crosstalk amount when the optical axis of the optical beam BM is deviated in the same direction as the scan direction of the optical beam BM.

Therefore, depending upon the delay amounts of the delay circuits 36 and 37, the polarity of the tilt is different. As a matter of fact, however, the crosstalk amount of the tangential direction can be detected by using either the crosstalk amounts in the white circle positions or the crosstalk amounts in the black circle positions. Alternatively, the polarity of the tilt amount derived by either the crosstalk amounts in the white circle positions or the crosstalk amounts in the black circle positions may be inverted and both of the cross talk amounts may be added together. Incidentally, a concrete example of a delay time τ in the delay circuits 36 and 37 is as following. It is now assumed that λ represents the wavelength of the optical beam BM and NA represents the numerical aperture of the objective lens 2. When detecting the crosstalk amount in the white circle positions, for example, the delay time τ is expressed by a following expression.

$$\tau < 0.6 \times (\lambda/NA) \times (1/V_L)$$

Alternatively, when detecting the crosstalk amount in the black circle positions, the delay time τ is expressed by a following expression.

$$\tau \geq 0.6 \times (\lambda/NA) \times (1/V_L)$$

Figure 8:
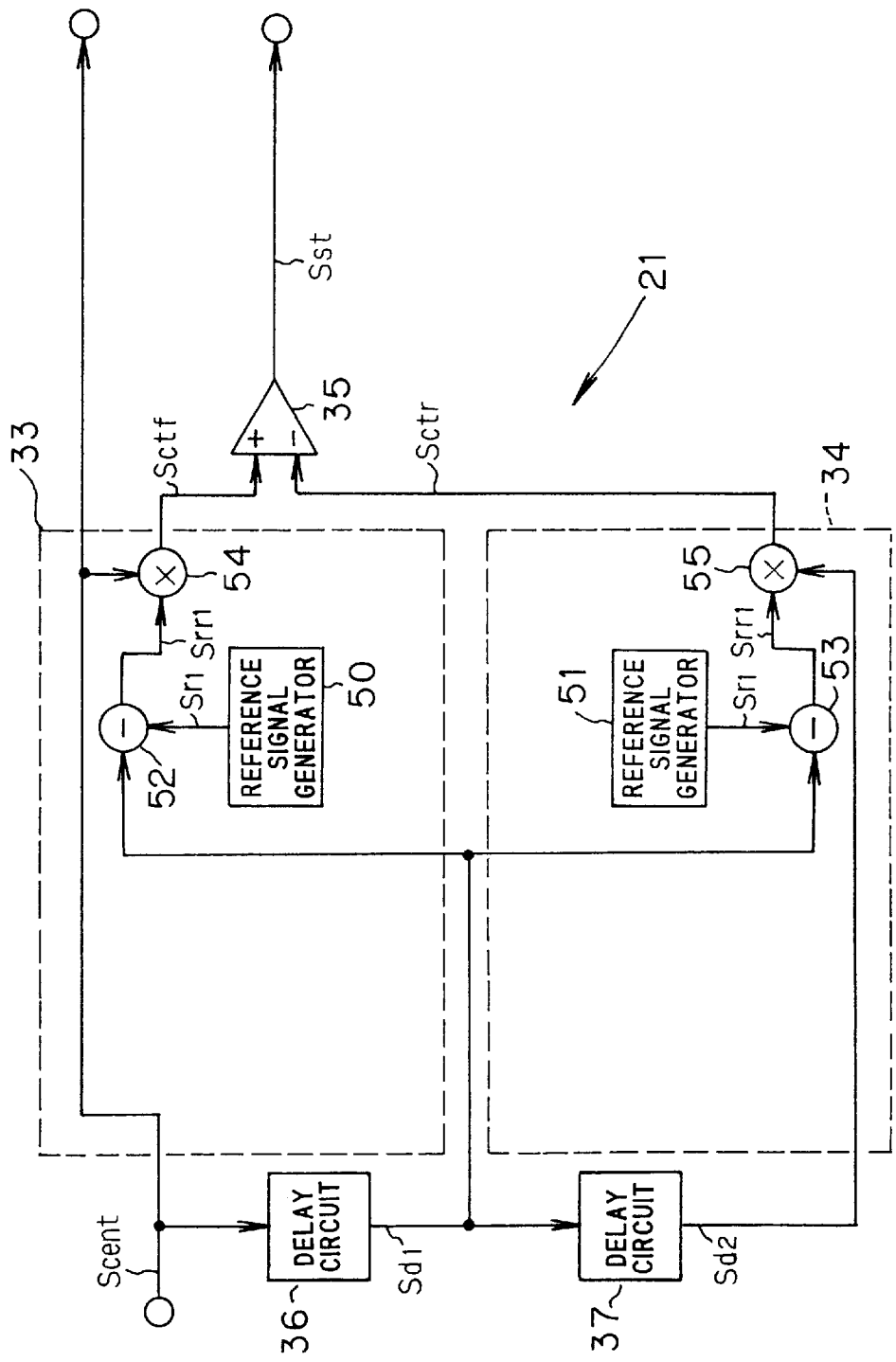
FIG. 8 is a block diagram showing a schematic configuration of a tangential tilt detector of the first embodiment.

Next, the configurations of the crosstalk amount detection units 33 and 34, and the concrete crosstalk amount detection operation is described by referring to FIG. 8.

As shown in FIG. 8, the crosstalk amount detection unit 33 includes: a reference signal generator 50; a subtracter 52; and a multiplier 54.

Furthermore, the crosstalk amount detection unit 34 includes: a reference signal generator 51; a subtracter 53; and a multiplier 54.

Next, the operation is described by referring to FIG. 8. Incidentally, the crosstalk amount detection unit 33 and the crosstalk amount detection unit 34 detect the front crosstalk amount or rear crosstalk amount, and output the front crosstalk signal Sctf or the rear crosstalk signal Sctr by conducting the same operation. In the ensuing description, therefore, the operation will be described by taking the crosstalk amount detection unit 33 as a representative one.

As for the crosstalk amount detection unit 33 and the crosstalk amount detection unit 34, the foregoing description holds true by replacing the inner detected signal Sin in the crosstalk amount detection unit 30 with the central detected signal Scent in the crosstalk amount detection unit 33, replacing the central detected signal Scent in the crosstalk amount detection unit 30 or the crosstalk amount detection unit 31 with the delayed signal $Sd_1$ in the crosstalk amount detection unit 33 or the crosstalk amount detection unit 34, and replacing the outer detected signal Sout in the crosstalk amount detection unit 31 with the delayed signal $Sd_2$ in the crosstalk amount detection unit 34. As for the waveform diagram of various positions in the crosstalk amount detection unit 33 or 34, therefore, FIG. 5 is used instead.

First of all, as a premise, the detection of the front crosstalk amount in the crosstalk amount detection unit 33 is executed when the optical beam BM is applied to the above described reference region in the same way as the case of the crosstalk amount detection unit 30.

At first, the reference signal generator 50 generates a reference signal $Sr_1$ having the same waveform as that of the delayed signal $Sd_1$ which is supposed to be obtained when the optical beam BM is applied to the reference region in such a state that there is no crosstalk at all. The reference signal generator 50 then outputs the reference signal $Sr_1$ to the subtracter 52.

Subsequently, the subtracter 52 subtracts the reference signal $Sr_1$ from the delayed signal $Sd_1$ which is being input, thus generates an error signal $Srr_1$ and outputs the error signal $Srr_1$ to the multiplier 54. This error signal $Srr_1$ indicates the value of each sample of the crosstalk amount contained in the delayed signal $Sd_1$.

Subsequently, the multiplier 54 multiplies the generated error signal $Srr_1$ by the central detected signal Scent which is being inputted, and thereby generates the front crosstalk signal Sctf (shown in the lowermost stage of FIG. 5). The process conducted in the multiplier 54 is a process for extracting only the front crosstalk amount caused by the central detected signal Scent out of the error (front crosstalk or rear crosstalk) included in the error signal $Srr_1$ and generating the front crosstalk as the front crosstalk signal Sctf.

The front crosstalk signal Sctf output from the crosstalk amount detection unit 33 by the above described operation and the rear crosstalk signal Sctb output from the crosstalk amount detection unit 34 by the same operation are inputted to the subtracter 35. In accordance with the above described principle, the rear crosstalk signal Sctb is subtracted from the front crosstalk signal Sctf. The difference signal Sst indicating the tilt amount of the tangential direction is thus generated.

Thereafter, the difference signal Ssr and the difference signal Sst are outputted respectively to the radial tilt controller 22 and the tangential tilt controller 23 as described above.

Next, the configurations and operations of the radial tilt controller 22 and the tangential tilt controller 23 are described by referring to FIG. 9.

As shown in FIG. 9, the radial tilt controller 22 includes an integrator 22A and a driver 22B. The tangential tilt controller 23 includes an integrator 23A and a driver 23B.

Next, the operations of the radial tilt controller 22 and the tangential tilt controller 23 are described.

The integrator 22A supplied with the difference signal Ssr averages sample values included in the difference signal Ssr every predetermined interval and outputs the averaged sample values to the driver 22B. Then, the driver 22B conducts processing such as amplification on the averaged difference signal Ssr, and outputs a resultant signal to the liquid crystal panel 3 as the tilt correction control signal $Sc_1$.

On the other hand, the integrator 23A supplied with the difference signal Sst averages sample values included in the difference signal Sst every predetermined interval and outputs the averaged sample values to the driver 23B. The driver 23B conducts processing such as amplification on the averaged difference signal Sst, and outputs a resultant signal to the liquid crystal panel 3 as the tilt correction control signal $Sc_2$.

Then, the liquid crystal panel 3 is driven by the tilt correction control signal $Sc_1$ and the tilt correction control signal $Sc_2$. The wavefront aberration caused in the optical beam B by the tilt is thus corrected.

Next, the configuration and operation of the liquid crystal panel 3 will now be described by referring to FIGS. 10 to 13.

As shown in its longitudinal section view of FIG. 10, the liquid crystal panel 3 has a two-layer structure. With a glass substrate 3h in between, a subsidiary liquid crystal panel 3' for correcting the wavefront aberration caused by the tilt in the radial direction, and a subsidiary liquid crystal panel 3" for correcting the wavefront aberration caused by the tilt in the tangential direction constitute the liquid crystal panel 3.

With liquid crystal 3g containing liquid crystal molecules M in between, orientation films 3e and 3f for providing the liquid crystal 3g with predetermined molecule orientation are formed in the subsidiary liquid crystal panel 3'. Outside respective orientation films 3e and 3f, transparent electrodes 3c and 3d made of ITO (Indium-tin oxide) or the like are formed. On the outmost side of the subsidiary liquid crystal panel 3' which is connected to the subsidiary liquid crystal panel 3", a glass substrate 3a functioning as a protection layer is formed.

In this configuration, the transparent electrode 3c is divided into pattern electrodes corresponding to distribution of the wave front aberration in the radial direction as described later. The transparent electrode 3d is a uniform planar electrode having no pattern electrodes.

On the other hand, with liquid crystal 3m containing liquid crystal molecules M in between, orientation films 3k and 3l are formed in the subsidiary liquid crystal panel 3". Outside respective orientation films 3k and 3l, transparent electrodes 3i and 3j made of ITO or the like are formed. On the outmost side of the subsidiary liquid crystal panel 3"

which is connected to the subsidiary liquid crystal panel 3', a glass substrate 3b functioning as a protection layer is formed.

In this configuration, the transparent electrode 3j is divided into pattern electrodes corresponding to distribution of the wavefront aberration in the tangential direction as described later. The transparent electrode 3i is a uniform planar electrode having no pattern electrodes.

Figure 10A:
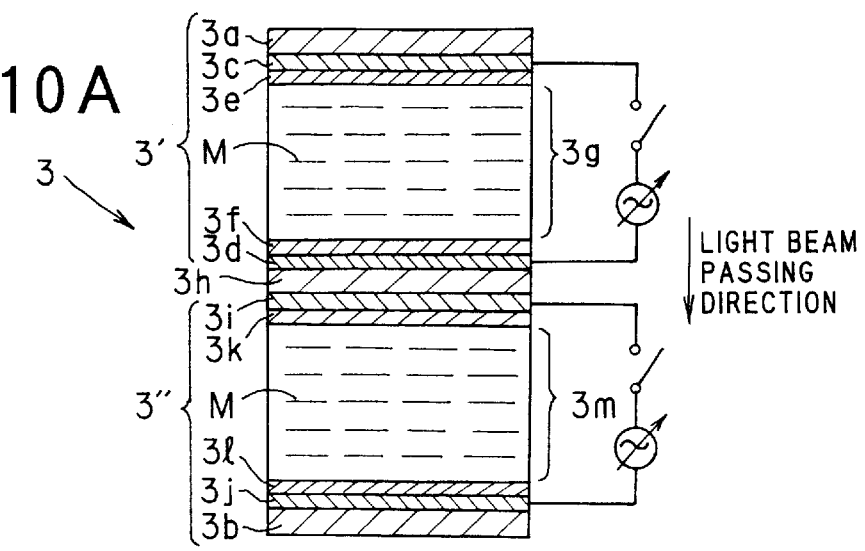
FIG. 10A is a cross sectional view of a liquid crystal panel.
Figure 10B:
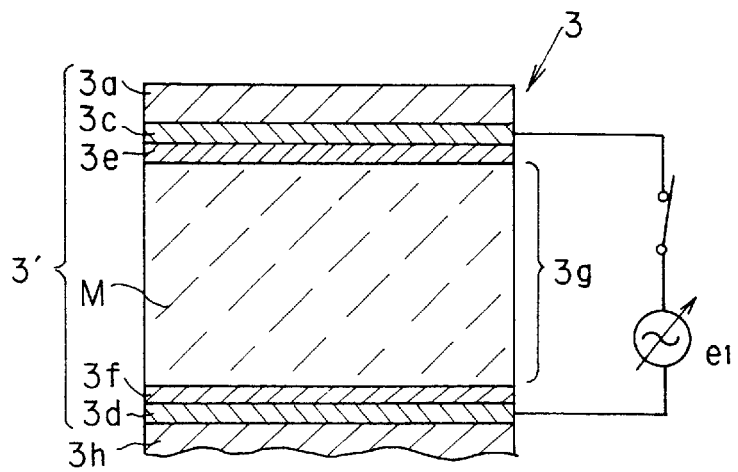
FIG. 10B is the cross sectional view of the liquid crystal panel in the case where the light beam is inclined with respect to liquid crystal molecule.
Figure 10C:
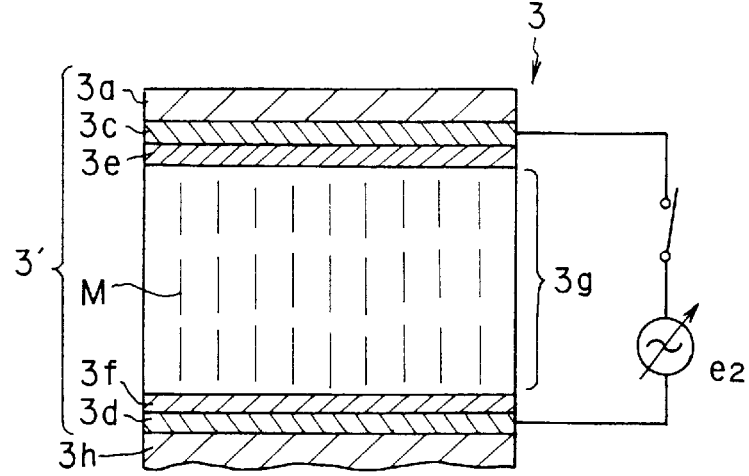
FIG. 10C is the cross sectional view of the liquid crystal panel in the case where the light beam is parallel with respect to the liquid crystal molecule.

As the liquid crystals 3g and 3m, those having a refractive index in the optical axis direction of the liquid crystal molecule M different from that in a direction perpendicular to the optical axis direction, i.e., those having a double refraction effect are used as shown in FIG. 10. By changing voltage values applied to the transparent voltages 3c, 3d, 3i, and 3j, directions of the liquid crystal molecules M can be changed freely from the horizontal direction to the vertical direction as shown in FIGS. 10A to 10C.

At this time, the transparent electrodes 3d and 3i are driven so as to have a uniform voltage value. On the other hand, the transparent electrode 3c is supplied with the tilt correction control signal $Sc_1$ for the radial tilt correction from the radial tilt controller 22 every pattern electrode thereof. Furthermore, the transparent electrode 3j is supplied with the tilt correction control signal $Sc_2$ for the tangential tilt correction from the tangential tilt controller 23 every pattern electrode thereof.

Figure 11A:
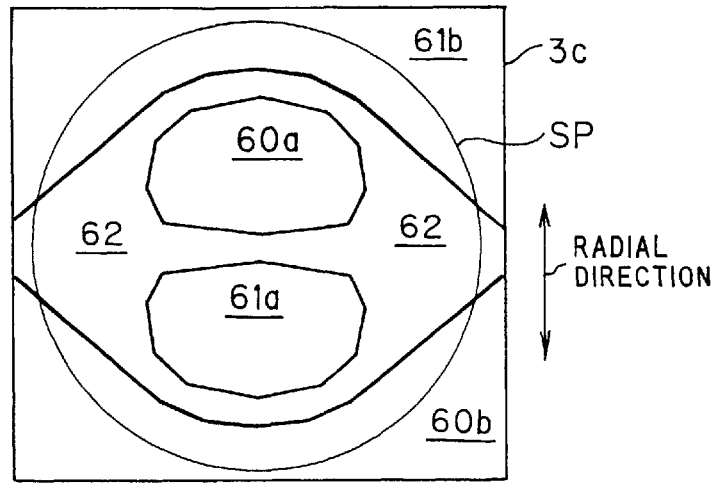
FIG. 11A is a plan view showing a structure of transparent electrodes of the liquid crystal panel, for correcting the radial tilt.
Figure 11B:
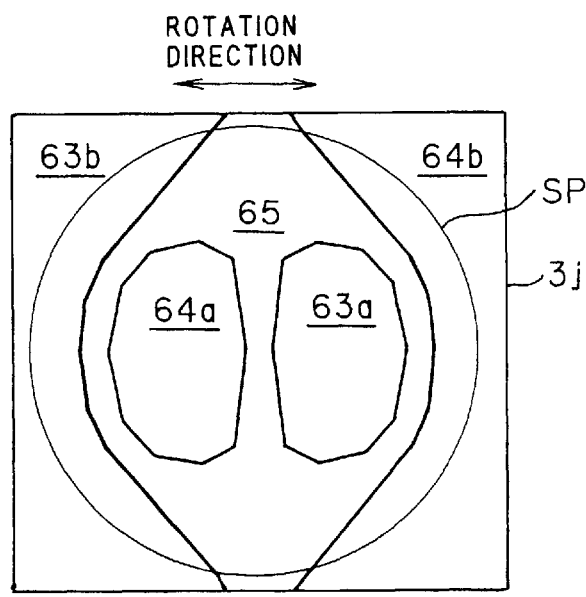
FIG. 11B is a plan view showing a structure of transparent electrodes of the liquid crystal panel, for correcting the tangential tilt.

Next, the configurations of the transparent electrodes 3c and 3j are now described by referring to FIGS. 11A to 11C.

As shown in FIG. 11A, the transparent electrode 3c is divided into five pattern electrodes 60a, 60b, 61a, 61b and 62 arranged so as to be line symmetrical. Respective pattern electrodes are mutually insulated. Among these pattern electrodes, the pattern electrodes 60a and 60b are driven by the same tilt correction control signal $Sc_1$. The pattern electrodes 61a and 61b are driven by the same tilt correction control signal $Sc_1$. The tilt correction control signal $Sc_1$ applied to the pattern electrodes 60a and 60b has a polarity opposite to that of the tilt correction control signal $Sc_1$ applied to the pattern electrodes 61a and 61b. The reason why the transparent electrode 3c is divided into shapes shown in FIG. 11A is that it is desirable to make the shapes of the pattern electrodes (i.e., region divisions driven and controlled independently) identical to the shapes of the distribution of wavefront aberration generated in the radial direction described later. The size of the entire transparent electrode 3c is determined so as to make an incidence range SP of the optical beam BM onto the transparent electrode 3c equal to a range as shown in FIG. 11A.

On the other hand, the transparent electrode 3j is divided into five pattern electrodes 64a, 64b, 63a, 63b and 65 arranged so as to be line symmetrical as shown in FIG. 11B. Respective pattern electrodes are mutually insulated. Among these pattern electrodes, the pattern electrodes 64a and 64b are driven by the same tilt correction control signal $Sc_2$. The pattern electrodes 63a and 63b are driven by the same tilt correction control signal $Sc_2$. The tilt correction control signal $Sc_2$ applied to the pattern electrodes 64a and 64b has a polarity opposite to that of the tilt correction control signal $Sc_2$ applied to the pattern electrodes 63a and 63b. The reason why the transparent electrode 3j is divided into shapes shown in FIG. 11B is that it is desirable, in the same way as the case of the transparent electrode 3c, to make the shapes of the pattern electrodes identical to the shapes of the distribution of the wavefront aberration generated in the tangential direction described later. The size of the entire transparent electrode 3j is determined so as to make an incidence range SP of the optical beam B onto the transparent electrode 3j equal to a range as shown in FIG. 11B.

Next, the principle of correcting the wavefront aberration due to the tilt of the optical disc 1 conducted by the liquid crystal panel 3, and the factors determining the shapes of the above described respective pattern electrodes will be described by referring to FIGS. 11 to 13. Hereafter, the case where the wavefront aberration in the radial direction is corrected (i.e., the case where the wavefront aberration is corrected by applying the tilt correction control signal $Sc_1$ to the transparent electrode 3c) will be described.

First of all, the wavefront aberration in the pupil face of the objective lens 2 is represented as W (r, Ø), where (r, Ø) is polar coordinates of the pupil face.

Now, if the optical disc 1 is inclined with respect to the axis of the optical beam BM (i.e., a tilt has occurred), then wavefront aberration (mainly the coma aberration) occurs as described above, and it becomes impossible to narrow down the optical beam BM by using the objective lens 2. In this case, wavefront aberration represented by a following expression (1) occupies a major portion of the wavefront aberration Wtlt (r, Ø) caused by the tilt angle.

$$\text{Wtlt } (r, Ø) \approx \omega_{31} \times r^3 \times \cos Ø + \omega_{11} \times r \times \cos Ø \qquad (1)$$

wherein $\omega_{31}$ and $\omega_{11}$ represent constants given by the tilt angle of the optical disc 1, the thickness of the substrate, the refractive index of the substrate and the numerical aperture (NA) of the objective lens 2, $\omega_{31}$ represents the coma aberration, $\omega_{11}$ represents the aberration caused by a movement of an image point. A result of calculation of the wavefront aberration distribution on the pupil face using this expression (1) corresponds to a wavefront aberration distribution shown in FIG. 12 (i.e., a wavefront aberration distribution caused by the tilt angle of the radial direction) described later.

Representing the standard deviation of the wavefront aberration W (r, Ø) on the pupil face by Wrms, the standard deviation Wrm is represented by a following expression (2).

$$\text{Wrms} = \{ \int\int (W (r, Ø) - Wo^2) r \, dr \, dØ/\pi \}^{1/2} \qquad (2)$$

wherein Wo in the expression (2) is the average value of W (r, Ø) on the pupil face. This Wrms is used for the evaluation of the wavefront aberration. By reducing this Wrms, a favorable reproduction less influenced by the wavefront aberration can be conducted.

As evident from the expression (2), the wavefront aberration can be corrected by making the value of W (r, Ø) small. Thus, in order to correct the Wtlt (r, Ø) caused by the inclination of the optical disc 1 to its radial direction, assuming that the refractive index of a region of the liquid crystal 3g corresponding to a certain pattern electrode is changed by Δn by controlling the tilt correction control signal $Sc_1$ applied to respective pattern electrodes on the transparent electrode 3c of the liquid crystal panel 3, by this change of the refractive index, it is possible to give an optical path difference Δn×d (where d is the thickness of the liquid crystal 3g) to the optical beam BM passing through a region corresponding to that pattern electrode.

Assuming that the optical path length given by the liquid crystal 3g is Wlc (r, Ø), the wavefront aberration W (r, Ø) in the radial direction on the pupil face of the objective lens 2 when the liquid crystal panel 3 is disposed is represented by a following expression (3).

$$W (r, Ø) = \text{Wtlt } (r, Ø) + \text{Wlc } (r, Ø) \qquad (3)$$

As evident form the expression (3), the wavefront aberration W (r, Ø) caused by the tilt in the radial direction of the optical disc 1 can be canceled by satisfying the following expression.

$$W (r, \emptyset) = Wtlt (r, \emptyset) + Wlc (r, \emptyset) = 0$$

In other words, it is found that it is necessary to give to the optical beam BM a wavefront aberration having a polarity opposite to the wavefront aberration Wtlt (r, ∅) caused by the tilt in the radial direction of the optical disc 1, i.e., a wavefront aberration Wlc (r, ∅) satisfying a following expression by using the liquid crystal 3g.

$$Wlc (r, \emptyset) = -Wtlt (r, \emptyset)$$

Figure 12:
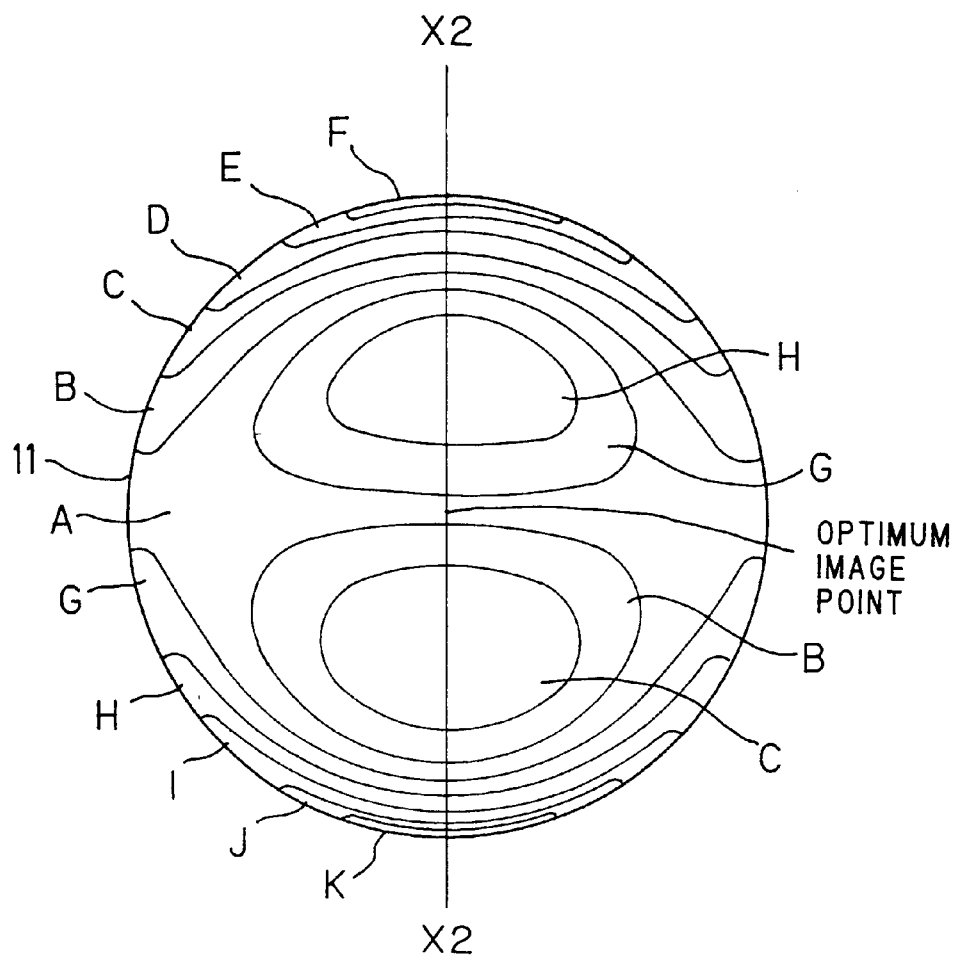
FIG. 12 is a plan view showing a distribution of the wavefront aberration.
Figure 13:
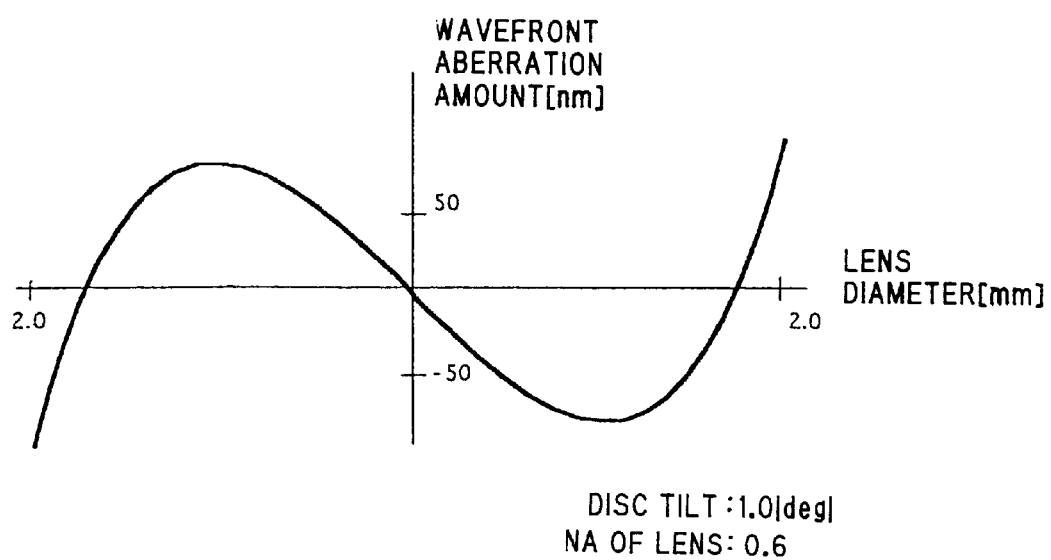
FIG. 13 is a graph showing the magnitude of the wavefront aberration.

Therefore, in order to give the wavefront aberration Wlc (r, ∅) of the opposite polarity to the wavefront aberration Wtlt (r, ∅) caused by the tilt angle of the optical disc 1, by using the liquid crystal 3g, respective pattern electrodes may me equipped so as to divide the liquid crystal 3g in association with the wavefront aberration distribution caused by the tilt angle in the radial direction of the optical disc 1 shown in FIG. 12, and the voltages applied to regions corresponding to the respective pattern electrodes may be controlled so as to give the wavefront aberration of opposite polarity to the wavefront aberration caused by the tilt in the radial direction to the wavefront aberration caused by the tilt in the radial direction.

FIG. 12 shows the wavefront aberration distribution of the radial direction seen on the pupil face of the objective lens 2. To be more concrete, FIG. 12 shows the wavefront aberration distribution in an optimum image point of the optical spot, within the range of a maximum region of the incident optical beam BM, in the case where the information recording face of the optical disc 1 is inclined by +1° in the radial direction. Centering around a region A having a range of −25 nm to +25 nm, values of the wavefront aberration are represented by boundary lines of regions A to K each having a range value of 50 nm. In FIG. 12, X2—X2 is an axis corresponding to the direction of inclination of the optical disc 1 (i.e., corresponding to the radial direction). In FIG. 13, the wavefront aberration distribution is represented by the distribution characteristic on the X2—X2 axis.

The distribution itself of the wavefront aberration does not depend upon the magnitude of the tilt in the radial direction, but has a constant distribution shape. The wavefront aberration amount changes depending upon the magnitude of the tilt. This point will now be described by referring to FIG. 13. The peak value of a curve shown in FIG. 13 becomes higher as the tilt becomes large, and becomes lower as the tilt becomes small.

Paying attention to the distribution of the wavefront aberration, the shape of division of the transparent electrode 3c is made similar to the wavefront aberration distribution of FIG. 12 in the liquid crystal panel of the present embodiment. The region of the liquid crystal 3g corresponding to each pattern electrode gives a phase difference to the optical beam BM so as to cancel the wavefront aberration Wtlt (r, ∅) which is occurring. The influence of the wavefront aberration Wtlt (r, ∅) caused by the tilt in the radial direction is thus reduced to such a range as not to affect the reproduction. In other words, the voltage control is effected by using the tilt correction control signal Sc$_1$ every division region of the liquid crystal 3g (every division region corresponding to each pattern electrode). As a result, the direction of the liquid crystal molecules M is changed, and the refractive index of each division region is changed. Thereby, by giving a phase difference to the optical beam BM, the wavefront aberration Wtlt (r, ∅) caused when the disc 1 is inclined in the radial direction is corrected.

As heretofore described, each of the pattern electrodes shown in FIG. 11A has a shape which is set on the basis of the wavefront aberration distribution in the case where the recording face of the optical disc 1 is inclined in the radial direction by +1° (as shown in FIG. 12). The transparent electrode 3c has five pattern electrodes corresponding to the case where the wavefront aberration is approximated by five values.

Incidentally, the region corresponding to the pattern electrode 62 is a region containing the region having the value of the wavefront aberration equivalent to 0. The region of the liquid crystal 3g corresponding to the pattern electrode 61b and the region of the liquid crystal 3g corresponding to the pattern electrode 60b have symmetrical shapes, and the values of the phase differences given to the transmitted optical beam BM by these regions have opposite polarities. Furthermore, the region of the liquid crystal 3g corresponding to the pattern electrode 60a and the region of the liquid crystal 3g corresponding to the pattern electrode 61a have symmetrical shapes, and the values of the phase differences given to the transmitted optical beam B by these regions have opposite polarities.

In the foregoing description referring to FIGS. 10 to 13, the case where the wavefront aberration of the optical disc 1 caused in the radial direction is corrected has been described. In the case where the wavefront aberration caused in the tangential direction of the optical disc 1 is corrected, by applying the contents of the shapes of the pattern electrodes of the transparent electrode 3c and so on with rotating them by an angle of 90°, it corresponds to the case where the wavefront aberration of the tangential direction is corrected by using the transparent electrode 3j. Therefore, the shapes of the pattern electrodes 64a, 64b, 63a, 63b and 65 in the transparent electrode 3j are also made into the shape similar to the wavefront aberration distribution having a symmetry axis parallel to the tangential direction (i.e., the wavefront aberration distribution in the case where the X2—X2 axis in FIG. 12 is set as the tangential direction).

The pattern electrodes 64a, 64b, 63a, 63b and 65 are driven by the tilt correction control signal Sc$_2$, and correct the wavefront aberration caused by the tilt in the tangential direction.

As described above, according to the operation of the information reproducing apparatus S of the first embodiment, the tilt is detected on the basis of the central detected signal Scent and the like obtained by the irradiation of the optical beam B. For detecting the tilt, therefore, it is not necessary to emit another optical beam (such as an optical beam exclusive for the tilt direction as in the conventional technique) other than the optical beam B. The configuration for correcting the aberration can thus be simplified.

Furthermore, since a mechanical operating portion is not required for the tilt detection, the reliability of the aberration correcting apparatus is improved and the size can be reduced.

Therefore, the aberration caused by the tilt of the optical axis of the optical beam BM can be corrected accurately by a simple and small-sized configuration.

Further, since the radial tilt is detected by using the inner detected signal Sin or the outer detected signal Sout from an adjacent track and the tangential tilt is detected by using the central detected signal Scent, the tilts in the respective directions can be accurately detected and the wavefront aberration can be corrected.

Furthermore, since the inner crosstalk amount and the outer crosstalk amount are detected, and the wavefront aberration caused in the radial direction is corrected by making the difference between the inner crosstalk amount and the outer crosstalk amount equal to zero, the wavefront aberration can be corrected accurately with a simple configuration.

Furthermore, since the front crosstalk amount and the rear crosstalk amount are detected, and the wavefront aberration caused in the tangential direction is corrected by making the difference between the front crosstalk amount and the rear crosstalk amount equal to zero, the wavefront aberration can be corrected accurately with a simple configuration.

Furthermore, since the wavefront aberration is corrected by using the liquid crystal panel 3 disposed on the optical path of the optical beam B, the wavefront aberration can be corrected with a simple configuration.

Furthermore, since the wavefront aberration is corrected by applying a voltage based upon the tilt to the liquid crystal 3g or 3m in the liquid crystal panel 3 and thereby giving a phase difference to the optical beam B, the wavefront aberration of the optical beam B can be corrected efficiently.

Furthermore, since the transparent electrode in the liquid crystal panel 3 includes a plurality of pattern electrodes having shapes corresponding to the distribution of the wavefront aberration caused in the optical beam B, and the radial tilt controller 22 or the tangential tilt controller 23 applies a voltage individually to each pattern electrode to correct the wavefront aberration, the wavefront can be corrected efficiently.

Furthermore, since the optical beam B is focused onto the optical disc 1 by the objective lens 2 and the record information is reproduced by the demodulation unit 12, the wavefront aberration caused by the inclination of the optical axis can be corrected and the information can be reproduced accurately with a simple configuration.

(II) Second Embodiment

Next, a second embodiment which is another embodiment of the present invention will now be described by referring to FIGS. 14 to 16.

In the above described first embodiment, the configuration having the multiplier 44, 45, 54 or 55 in the crosstalk amount detection units 30, 31, 33 or 34 has been described. However, the second embodiment has such a configuration that each crosstalk amount is detected without using multipliers involving the complicated configurations in the circuit formation.

Figure 14:
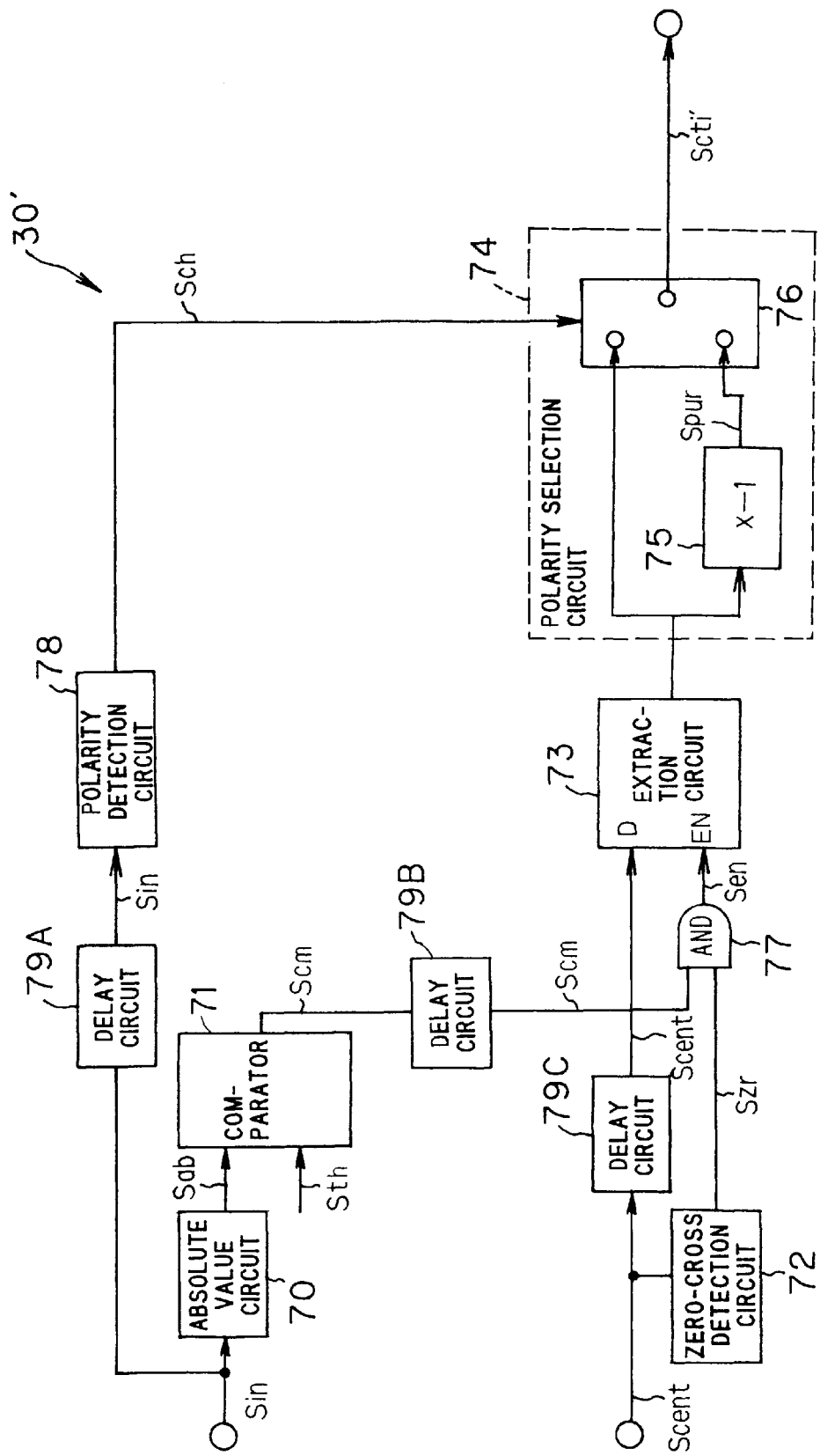
FIG. 14 is a block diagram showing a schematic configuration of a cross talk amount detection unit of a second embodiment.
Figure 15:
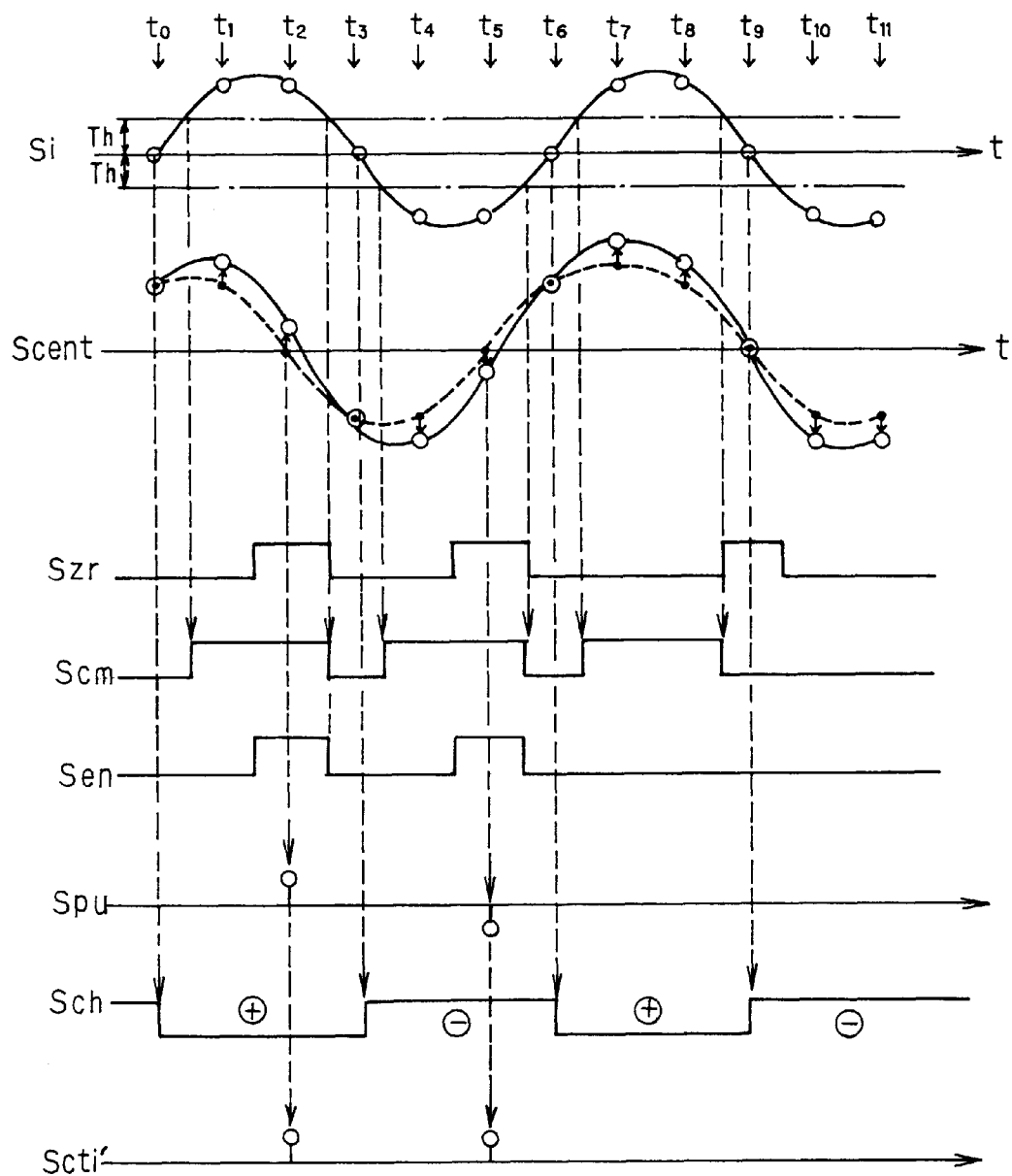
FIG. 15 is a timing chart showing an operation of the cross talk amount detection unit of the second embodiment.

First of all, the configuration of the crosstalk amount detection unit in the second embodiment is described by referring to FIG. 14. In the second embodiment, the configuration other than the respective crosstalk amount detection units is the same as that of the information reproducing apparatus S of the first embodiment, and consequently the detailed description thereof are omitted. Furthermore, the information reproducing apparatus of the second embodiment also has the four crosstalk amount detection units conducting the same operation in the same way as the information reproducing apparatus S of the first embodiment. In the ensuing description, however, a crosstalk amount detection unit 30' for detecting the inner crosstalk amount in the second embodiment will be described as a representative.

As shown in FIG. 14, the crosstalk amount detection unit 30' includes: an absolute value circuit 70; a comparator 71; a zero-cross detection circuit 72; an extraction circuit 73; a polarity selection circuit 74; an AND circuit 77; a polarity detection circuit 78; and three delay circuits 79A to 79C.

The polarity selection circuit 74 includes: an inverter 75; and a change-over unit 76.

The operation will now be described by referring to FIGS. 14 and 15.

In the crosstalk amount detection units such as 30 of the information recording and reproducing apparatus S of the above described first embodiment, the reference signal $Sr_1$ is subtracted from the inputted central detected signal Scent and a resultant difference is multiplied by the inner detected signal Sin, for example. In the crosstalk amount detection unit 30' of the second embodiment, only sample values of the central detected signal Scent located near zero-cross points are extracted, and the crosstalk amount is detected according to the extracted sample values. This is equivalent to the case where the reference signal $Sr_1$ in the crosstalk amount detection unit 30 of the information recording and reproducing apparatus S of the first embodiment is not a signal having a periodic waveform but a signal having only fixed values of zero.

The inner detected signal Sin inputted to the crosstalk amount detection unit 30' is delayed in the delay circuit 79A by one sampling period in the inner detected signal Sin, and is then outputted to the polarity detection circuit 78. In the polarity detection circuit 78, the polarity of the inner detected signal Sin is detected. In the absolute value circuit 70, the absolute value of the inner detected signal Sin is detected and is outputted as an absolute value signal Sab.

Then, in the comparator 71, each sample value contained in the absolute value signal Sab is compared with a value of a threshold signal Sth inputted thereto beforehand. Only each of sample values in the absolute value signal Sab having an absolute value greater than the value of the threshold signal Sth is outputted as a compared signal Scm (as shown in a fourth uppermost stage of FIG. 15). The reason why the comparator 71 compares the value of the threshold signal Sth with each sample value contained in the absolute value signal Sab and extracts only sample values each having a value larger than the value of threshold signal Sth in this way is that the sample values each having a value close to the zero level and smaller than the value of the threshold signal Sth among the sample values contained in the inner detected signal Sin can be handled as the sample values which cannot give the crosstalk to the central detected signal Scent.

On the other hand, the central detected signal Scent inputted to the crosstalk amount detection unit 30' is delayed in the delay circuit 79C by one sampling period of the central detected signal Scent, and outputted to the extraction circuit 73. In addition, the central detected signal Scent is inputted to the zero-cross detection circuit 72. The zero-cross detection circuit 72 generates a zero-cross signal Szr having a preset predetermined pulse width containing the timing of the zero-cross point of the central detected signal Scent (as shown in a third uppermost stage of FIG. 15).

Then, the above described compared signal Scm is delayed in the delay circuit 79B by one sampling period of the inner detected signal Sin. A resultant delayed signal and the zero-cross signal Szr are inputted to the AND circuit 77. As a logical product of them, a logical product signal Sen (as shown in a fifth uppermost stage of FIG. 15) is outputted. This logical product signal Sen detects such timing that the inner detected signal Sin is large enough to exert an influence of crosstalk on the central detected signal Scent and the central detected signal Scent is located near a zero-cross point. At such timing, the logical product signal Sen becomes "HIGH".

Then, the logical product signal Sen is inputted to an enable terminal of the extraction circuit 73. Only sample values of the central detected signal Scent inputted to the extraction circuit 73 at such timing that the logical product signal Sen is "HIGH" are inputted to the polarity selection circuit 74 as an extracted signal Spu (as shown in a third lowermost stage of FIG. 15). This extracted signal Spu indicates the crosstalk amount contained in the sample values of the central detected signal Scent located near zero-cross points (which is the sum of the outer crosstalk amount and the inner crosstalk amount caused by the influence of the sample values having such a magnitude as to be capable of providing the central detected signal Scent with crosstalk, among the sample values contained in the inner detected signal Sin).

Then, in the polarity selection circuit 74, the inputted extracted signal Spu is inputted to one of terminals of the switch 76 as it is, and is inputted to the inverter 75. Thereafter, the inverter 75 inverts the polarity of the inputted extracted signal Spu, and outputs a resultant signal to the other of the terminals of the switch 76 as an inverted extracted signal Spur.

On the other hand, the switch 76 is supplied with a polarity signal Sch (as shown in a second lowermost stage of FIG. 15) obtained as a result of judging the polarity of the inner detected signal Sin in the polarity detection circuit 78.

Then, on the basis of the polarity signal Sch, the switch 76 selects the extracted signal Spu when the polarity of the inner detected signal Sin is positive, and selects the inverted extracted signal Spur when the polarity of the inner detected signal Sin is negative. The selected signal is outputted as an inner crosstalk signal Scti'.

By the operation of the polarity selection circuit 74, a process similar to the process conducted by the multiplier 44 in the information reproducing apparatus S of the first embodiment is conducted on the extracted signal Spu. The inner crosstalk signal Scti' indicating the magnitude of the inner crosstalk is thus outputted. The timing adjustment of the whole in the operation heretofore described is executed by the delay circuits 79A to 79C.

Then, on the basis of the outer crosstalk signal generated by processing similar to that of the crosstalk amount detection unit 30', and the above described inner crosstalk signal Scti', the tilt amount in the radial direction is detected by the operation similar to that of the information reproducing apparatus S of the first embodiment. The wavefront aberration caused by the tilt in the radial direction is thus corrected.

As for the tangential direction as well, the front crosstalk amount and the rear crosstalk amount are respectively detected by two crosstalk amount detection units each having a configuration similar to that of the crosstalk amount detection unit 30'. On the basis of the detected front crosstalk amount and rear crosstalk amount, the tilt amount in the tangential direction is detected by the operation similar to that of the information reproducing apparatus S of the first embodiment. The wavefront aberration caused by the tilt in the tangential direction is thus corrected.

Next, the configuration and operation of the zero-cross detection circuit 72 in the above described crosstalk amount detection unit 30' is described by referring to FIG. 16.

Figure 16A:
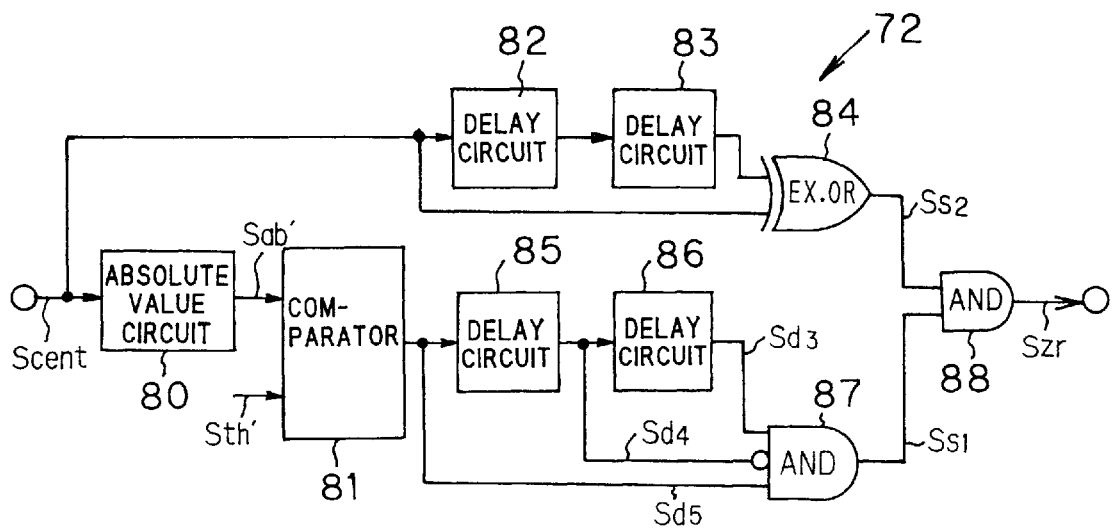
FIG. 16A is a block diagram showing a zero cross detection unit of the second embodiment.

As shown in FIG. 16A, the zero-cross detection circuit 72 includes: an absolute value circuit 80; a comparator 81; delay circuits 82, 83, 85 and 86; an exclusive OR circuit 84; and AND circuits 87 and 88.

Figure 16B:
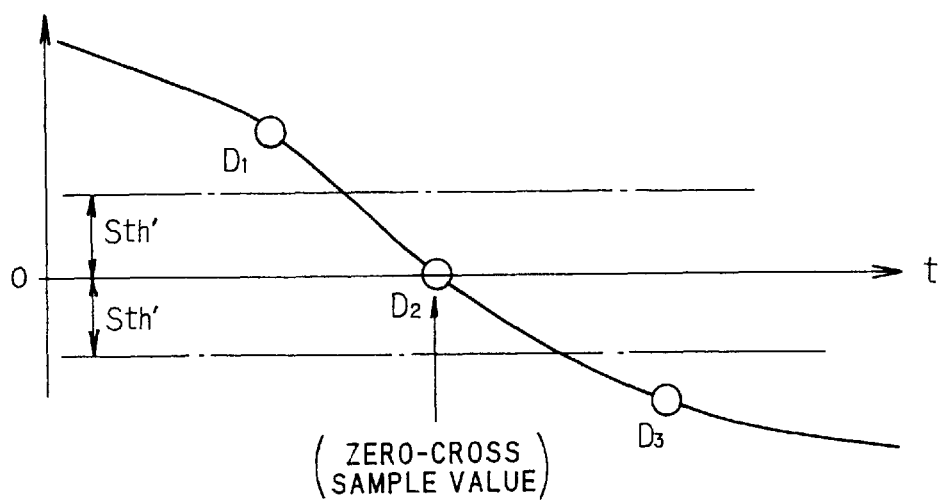
FIG. 16B is a timing chart showing an operation of the zero cross detection unit of the second embodiment.

The operation is now described by referring to FIG. 16B.

The central detected signal Scent inputted to the zero-cross detection circuit 72 is inputted as it is to the absolute value circuit 80, one terminal of the exclusive OR circuit 84 and the delay circuit 82.

Then, in the delay circuit 82, the central detected signal Scent is delayed by one sampling period (i.e., by one sampling period of the sampling frequency of the A/D converter 26). Furthermore, the central detected signal Scent is delayed by the same time in the delay circuit 83 as well, and is inputted to the other terminal of the exclusive OR circuit 84. In other words, a sample value represented by a character $D_1$ in FIG. 16 B and a sample value represented by a character $D_3$ are simultaneously inputted to the exclusive OR circuit 84. The exclusive OR circuit 84 outputs an exclusive OR signal $Ss_2$ which becomes "HIGH" only when the sign of the sample value indicated by the character $D_1$ is different from the sign of the sample value indicated by the character $D_3$. The exclusive OR signal $Ss_2$ is inputted to one terminal of the AND circuit 88.

As for the central detected signal Scent inputted to the absolute value circuit 80, the absolute value thereof is detected in the absolute value circuit 80 and is outputted as an absolute value signal Sab'.

Then, each sample value contained in the absolute value signal Sab' is compared in the comparator 81 with a value of a threshold signal Sth' inputted beforehand. A comparison signal $Sd_5$ is thus outputted. When a sample value in the absolute value signal Sab' having an absolute value larger than the value of the threshold signal Sth' is inputted to the comparator 81, the comparison signal $Sd_5$ becomes "HIGH." When a sample value in the absolute value signal Sab' having an absolute value smaller than the value of the threshold signal Sth' is inputted to the comparator 81, the comparison signal $Sd_5$ becomes "LOW." The comparison signal $Sd_5$ is outputted to a first terminal of the AND circuit 87 having three input terminals.

On the other hand, the comparison signal $Sd_5$ is inputted to the delay circuit 85 as well, is delayed therein by one sampling period of the sampling frequency of the A/D converter 26, and is outputted as a delayed comparison signal $Sd_4$. This delayed comparison signal $Sd_4$ is inputted to the subsequent delay circuit 86 as it is. In addition, the delayed comparison signal $Sd_4$ is inverted in "HIGH"/"LOW" and is inputted to a second terminal of the AND circuit 84.

Next, the delay circuit 86 further delays the delayed comparison signal $Sd_4$ by one sampling period of the sampling frequency of the A/D converter 26, and outputs a resultant signal to a third terminal of the AND circuit 87 as a delayed comparison signal $Sd_3$.

The AND circuit 87 generates a logical product signal $Ss_1$. Only when all of three signals simultaneously inputted are "HIGH," the logical product signal $Ss_1$ becomes "HIGH." The logical product signal $Ss_1$ is inputted to the other terminal of the AND circuit 88.

Here, the comparison signal $Sd_5$ corresponds to the sample value indicated by the character $D_3$ in FIG. 16B, the delayed comparison signal $Sd_4$ corresponds to the sample value indicated by a character $D_2$ in FIG. 16B, and the delayed comparison signal $Sd_3$ corresponds to the sample value indicated by the character $D_1$ in FIG. 16B. The delayed comparison signal $Sd_4$ is inputted to the AND circuit 87 after being inverted. As a result, the logical product signal $Ss_1$ inputted to the other terminal of the AND circuit 88 becomes "HIGH" only when both of the absolute value of the sample value indicated by the character $D_3$ and the absolute value of the sample value indicated by the character $D_1$ are larger than the value of the threshold signal Sth' and the absolute value of the sample value indicated by the character $D_2$ is smaller than the value of the threshold signal Sth'.

On the other hand, the one terminal of the AND circuit 88 is supplied with the exclusive OR signal $Ss_2$ which becomes "HIGH" only when the sample value indicated by the character $D_1$ and the sample value indicated by the character $D_3$ have different signs. As a result, the zero-cross signal Szr which is the output signal of the AND circuit 88 becomes "HIGH," when a sample value, which has an absolute value smaller than the value of the threshold signal Sth' and which is a sample value indicated by the character $D_2$ having a sign different from that of both of the sample values adjacent thereto (i.e., zero-cross sample value), is inputted to the extraction circuit 73.

Strictly speaking, the zero-cross signal Szr becomes "HIGH" when the sample value indicated by the character $D_3$ is outputted from the zero-cross detection circuit 72. However, the central detected signal Scent inputted to the extraction circuit 73 has been delayed in the delay circuit 79C by one sampling period. As a result, the logical product signal Sen, which becomes "HIGH" when the sample value of the central detected signal Scent indicated by the character $D_2$ is inputted to the extraction circuit 73, is inputted to the enable terminal of the extraction circuit 73.

According to the information reproducing apparatus including the crosstalk amount detection unit 30' of the second embodiment, multipliers each having a complicated configuration become unnecessary as heretofore described. Effects similar to those of the information reproducing apparatus S can be obtained with a simple configuration.

In the above described configuration of the crosstalk amount detection unit 30', the delay circuits 79A to 79C are needed in the case where the configuration shown in FIG. 16A is used as the zero-cross detection circuit 72. If a configuration which does not include the delay circuits (e.g., such a configuration that only sample values each located near the zero level and having a value which does not exceed a predetermined threshold value are extracted out of the sample values of the central detected signal Scent and are outputted as the zero-cross signal Szr) is used as the zero-cross detection circuit 72, the delay circuits 79a to 79C become unnecessary.

(III) Third Embodiment

A third embodiment which is another embodiment of the present invention will now be described by referring to FIGS. 17 and 18.

In the above described first and second embodiments, the radial tilt detector 20 generates the difference signal Ssr representing the tilt amount of the radial direction by subtracting the outer crosstalk signal Scto from the inner crosstalk signal Scti, and the tangential tilt detector 21 generates the difference signal Sst representing the tilt amount of the tangential direction by subtracting the rear crosstalk signal Sctr from the front crosstalk signal Sctf.

In a radial tilt detector and a tangential tilt detector of the third embodiment replacing the radial tilt detector 20 and the tangential tilt detector 21, a crosstalk canceler (a so-called CTC) for removing the crosstalk from the central detected signal Scent is constituted. By regarding a tap coefficient indicating the cancel amount in the CTC as a parameter indicating the crosstalk amount, the crosstalk amount is detected.

First of all, the principle of the third embodiment will now be described by referring to the case where the radial tilt is detected.

The crosstalk amount on the central detected signal Scent is represented by a following expression.

$$Scent = Sr_1 + a \times Sin + b \times Sout$$

wherein $Sr_1$ is the above described reference signal, i.e., an ideal central detected signal which does not contain the crosstalk, a is a crosstalk coefficient from the inner detected signal Sin, and b is a crosstalk coefficient from the outer detected signal Sout.

On the other hand, assuming that a tap coefficient for removing the inner crosstalk is Cin and a tap coefficient for removing the outer crosstalk is Cout, the central detected signal Scent' after the crosstalk has been removed is expression by a following expression.

$$Scent' = Scent - Cin \times Sin - Cout \times Sout = Sr_1 + (a-Cin) \times Sin + (b-Cout) \times Sout$$

If the crosstalk remains in the central detected signal Scent', a coefficient control unit for controlling the tap coefficient in the third embodiment controls the tap coefficient so as to cancel the remaining crosstalk. (Details of the coefficient control unit will be described later.) The central detected signal Scent' finally becomes a signal containing no crosstalk. In other words, the relationship between the inner crosstalk and the coefficient a and the relationship between the outer crosstalk and the coefficient b are respectively expressed by following expressions.

$$a - Cin = 0 \text{ and } b - Cout = 0.$$

Therefore, a=Cin and b=Cout.

Eventually, the respective tap coefficients a and b represent respective crosstalk amounts.

Next, the radial tilt detector and the tangential tilt detector of the third embodiment for detecting the tilt amounts on the basis of the above described principle will now be described by referring to FIGS. 17 and 18. In FIGS. 17 and 18, the same constitutional elements as those in the first embodiment carry the same reference numerals, and the detailed explanations thereof are omitted. Furthermore, in the third embodiment, configuration other then the radial tilt detector and the tangential tilt detector described later is the same as that of the information reproducing apparatus S of the first embodiment, and consequently the detailed explanations thereof are omitted.

Figure 17:
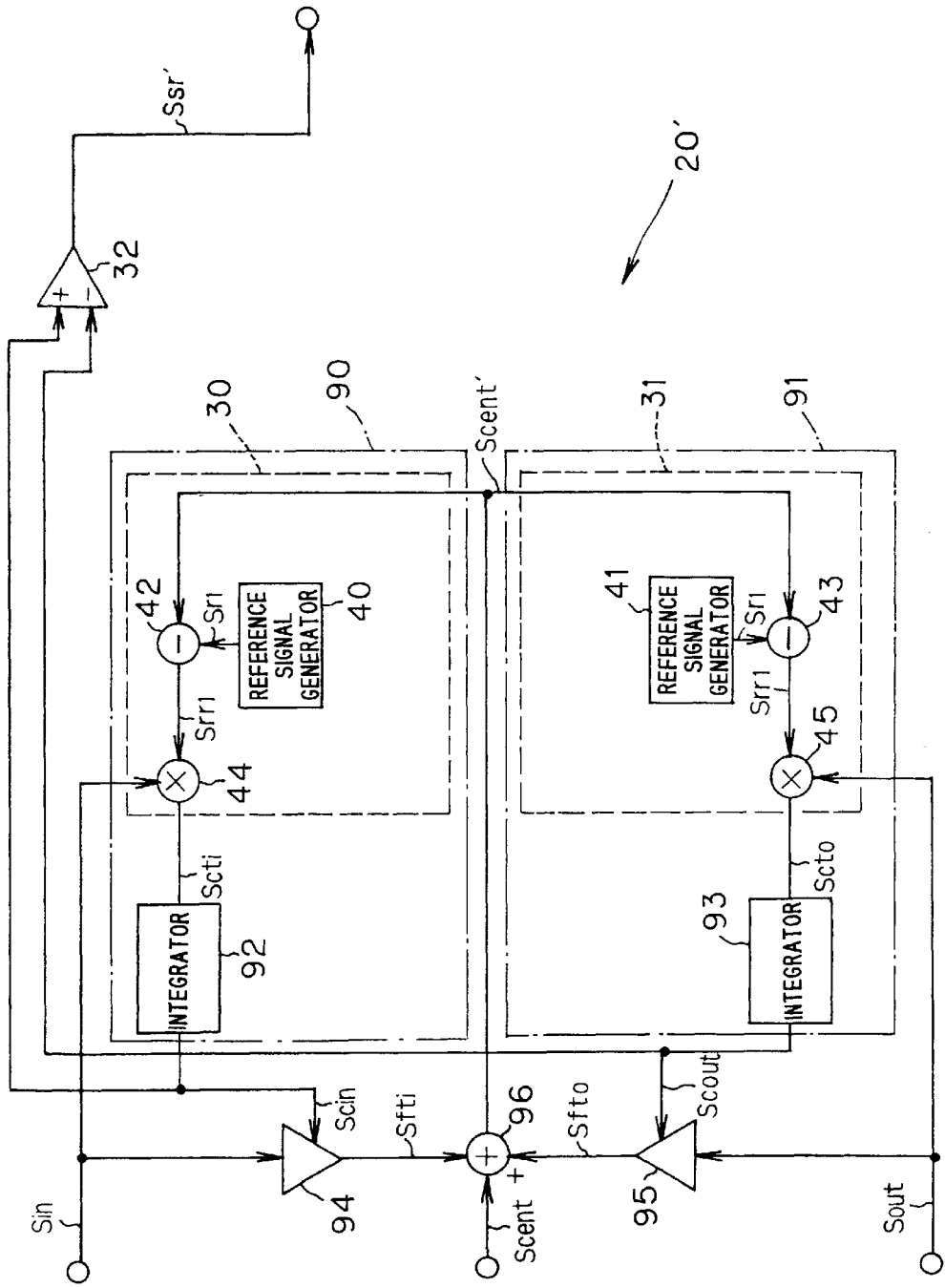
FIG. 17 is a block diagram showing a schematic configuration of a radial tilt detector of a third embodiment.

First of all, the radial tilt detector of the third embodiment is described by referring to FIG. 17.

As shown in FIG. 17, a radial tilt detector 20' of the third embodiment includes: coefficient control units 90 and 91; filters 94 and 95 which are digital transversal filters each having the number of taps equivalent to "1"; a subtracter 96 serving as one example of a subtraction device; and a subtracter 32 similar to that of the radial tilt detector 20 of the first embodiment.

The coefficient control unit 90 includes: the crosstalk amount detection unit 30 of the first embodiment; and an integrator 92.

The coefficient control unit 91 includes: the crosstalk amount detection unit 31 of the first embodiment; and an integrator 93.

The operation is now described.

The inner detected signal Sin inputted to the radial tilt detector 20' is outputted to the filter 94, and is also outputted to a multiplier 44 in the crosstalk amount detection unit 30.

On the other hand, from the central detected signal Scent inputted to the crosstalk amount detector 20', a filter signal Sfti representing the inner crosstalk amount supplied from the filter 94 and a filter signal Sfto representing the outer crosstalk amount supplied from the filter 95 are subtracted in the subtracter 96. Thereafter, the result is outputted to a subtracter 42 in the crosstalk amount detection unit 30 and a subtracter 43 in the crosstalk amount detection unit 31 as a central detected signal Scent' with the reduced crosstalk.

Then, by using the inner detected signal Sin and the central detected signal Scent' which are being inputted, the crosstalk amount detection unit 30 generates the inner crosstalk signal Scti representing the inner crosstalk amount by conducting an operation similar to that of the first embodiment, and outputs the inner crosstalk signal Scti to the integrator 92.

After that, by integrating and averaging the inner crosstalk signal Scti, the integrator 92 generates a tap control signal Scin (corresponding to the above described tap coefficient Cin) for controlling the tap coefficient of the filter 94, and outputs the tap control signal Scin to the filter 94 and the subtracter 32.

Finally, the filter 94 generates the above described filter signal Sfti on the basis of the tap control signal Scin, and outputs the filter signal Sfti to the subtracter 96.

On the other hand, the basis of the central detected signal Scent' and the outer detected signal Sout respectively inputted, the coefficient control unit 91 generates a tap control signal Scout (corresponding to the above described tap coefficient Cout) for controlling the tap coefficient of the filter 95 by conducting an operation similar to that of the coefficient control unit 90, and outputs the tap control signal Scout to the filter 95 and the subtracter 32.

The filter 95 generates the above described filter signal Sfto on the basis of the tap control signal Scout, and outputs the filter signal Sfto to the subtracter 96.

In the subtracter 96, the filter signal Sfti and the filter signal Sf to which are being inputted are subtracted from the central detected signal Scent. A central detected signal Scent' with the crosstalk amount reduced is newly generated. In the generation of the central detected signal Scent', the inner crosstalk and the outer crosstalk contained in the central detected signal Scent are not removed at once by the filter signal Sfti and the filter signal Sfto, but they are gradually reduced by repetition of the operation of a closed loop including the coefficient control units 90 and 91 and the filters 94 and 95. Finally, the central detected signal Scent' which does not contain respective crosstalks is generated.

On the other hand, on the basis of the above described principle, the subtracter 32 subtracts the tap control signal Scout from the tap control signal Scin, thereby generates a difference signal Ssr' representing the crosstalk amount of the radial direction, and outputs the difference signal Ssr' to the radial tilt controller 22.

Next, the tangential tilt detector of the third embodiment will now be described by referring to FIG. 18.

Figure 18:
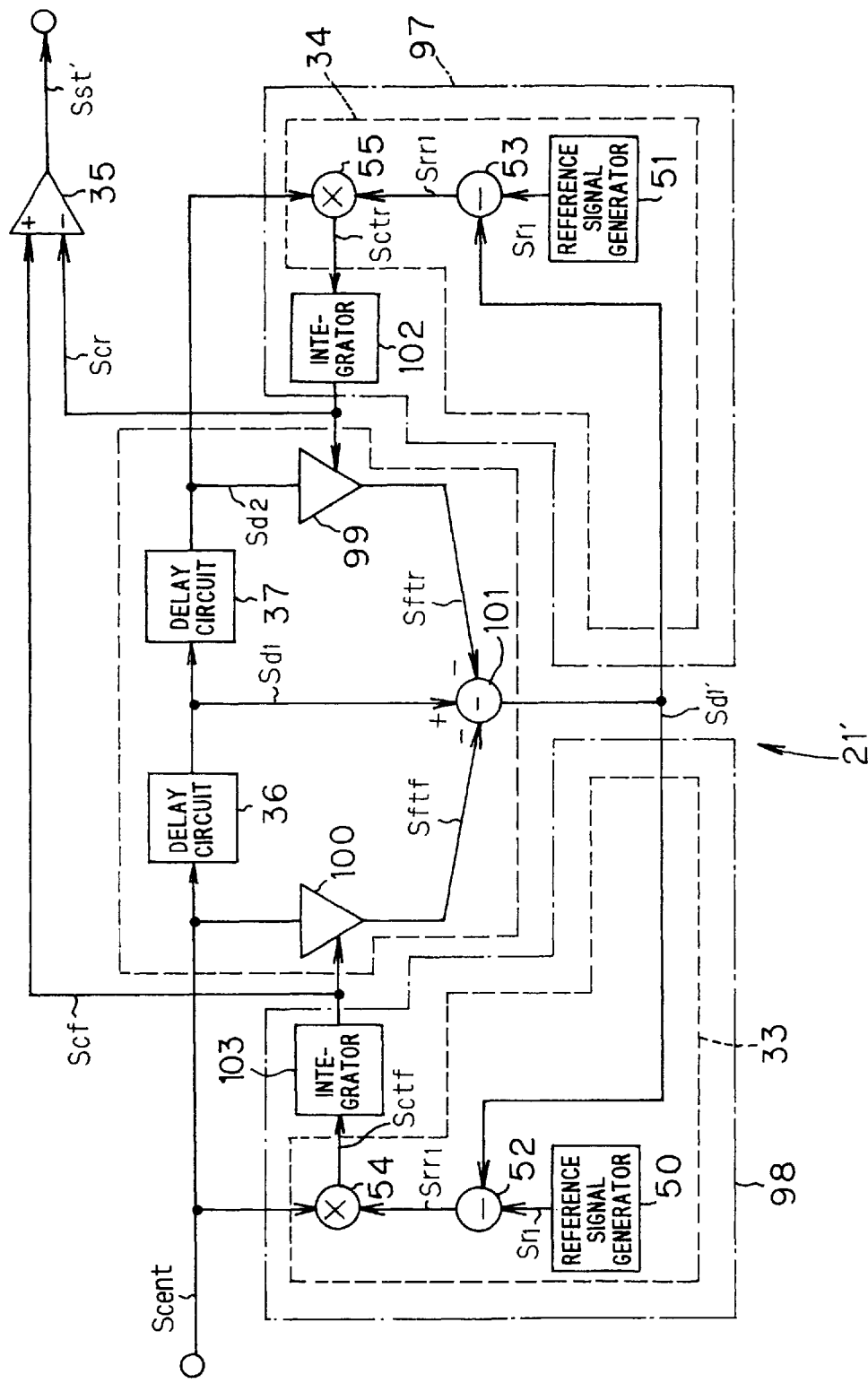
FIG. 18 is a block diagram showing a schematic configuration of a tangential tilt detector of the third embodiment.

As shown in FIG. 18, the tangential tilt detector 21' includes: coefficient control units 97 and 98; filters 99 and 100 which are digital transversal filters each having the number of taps equivalent to 1; and a subtracter 101. The tangential tilt detector 21' further includes: a subtracter 35; and delay circuits 36 and 37 in the same way as the tangential tilt detector 21 of the first embodiment.

The coefficient control unit 97 includes: the crosstalk amount detection unit 34 of the first embodiment; and an integrator 102.

The coefficient control unit 98 includes: the crosstalk amount detection unit 33 of the first embodiment; and an integrator 103.

The operation is now described.

The central detected signal Scent inputted to the tangential tilt detector 21' is outputted to the delay circuit 36, and the filter 100, and is also outputted to a multiplier 54 in the crosstalk amount detection unit 33.

From the delayed signal $Sd_1$ outputted from the delay circuit 36, a filter signal Sftf representing the front crosstalk amount supplied from the filter 100 and a filter signal Sftr representing the rear crosstalk amount supplied from the filter 99 are subtracted in the subtracter 101. Thereafter, the result is outputted to a subtracter 52 in the crosstalk amount detection unit 33 and a subtracter 53 in the crosstalk amount detection unit 34 as a delayed signal $Sd_1$' with reduced crosstalk.

By using the central detected signal Scent and the delayed signal $Sd_1$' which are being inputted, the crosstalk amount detection unit 33 generates the front crosstalk signal Sctf representing the front crosstalk amount by conducting an operation similar to that of the first embodiment, and outputs the front crosstalk signal Sctf to the integrator 103.

After that, by integrating and averaging the front crosstalk signal Sctf, the integrator 103 generates a tap control signal Scf for controlling the tap coefficient of the filter 100, and outputs the tap control signal Scf to the filter 100 and the subtracter 35.

Finally, the filter 100 generates the above described filter signal Sftf on the basis of the tap control signal Scf, and outputs the filter signal Sftf to the subtracter 101.

On the other hand, on the basis of the delayed signal $Sd_1$' and the delayed signal $Sd_2$ (obtained by further delaying the delayed signal $Sd_1$ in the delay circuit 37) respectively inputted, the coefficient control unit 97 generates a tap control signal Scr for controlling the tap coefficient of the filter 99 by conducting an operation similar to that of the coefficient control unit 98, and outputs the tap control signal Scr to the filter 99 and the subtracter 35.

Finally, the filter 99 generates the above described filter signal Sftr on the basis of the tap control signal Scr, and outputs the filter signal Sftr to the subtracter 101.

Then, in the subtracter 101, the filter signal Sftr and the filter signal Sftf which are being inputted are subtracted from the delayed signal $Sd_1$. A delayed signal $Sd_1$' with the crosstalk amount reduced is newly generated.

On the other hand, on the basis of the above described principle, the subtracter 35 subtracts the tap control signal Scr from the tap control signal Scf, thereby generates a difference signal Sst' representing the crosstalk amount in the tangential direction, and outputs the difference signal Sst' to the tangential tilt controller 23.

After the above described operation of the radial tilt detector 20' and the tangential tilt detector 21', the tilt correction control signal $Sc_1$ and the tilt correction control signal $Sc_2$ are generated in the radial tilt controller 22 and the tangential tilt controller 23, respectively. By the tilt correction control signal $Sc_1$ and the tilt correction control signal $Sc_2$, the liquid crystal panel 3 is driven to correct the wavefront aberration.

By the operation of the radial tilt detector 20' and the tangential tilt detector 21' of the third embodiment as well, effects similar to those of the information reproducing apparatus S of the first embodiment can be obtained as heretofore described.

In the above described third embodiment, the crosstalk amount is detected by four single-tap filters. Alternatively, tilts in each direction may be detected by using filters having two or more taps. In this case, for example, the sum of the tap control signals of filters concerning the inner crosstalk in the radial direction may be calculated and used as the tap control signal representing the inner crosstalk amount, and the sum of the tap control signals of filters concerning the outer crosstalk may be calculated and used as the tap control signal representing the outer crosstalk amount.

In the foregoing description of the third embodiment, the radial tilt detector 20' or the tangential tilt detector 21' are used instead of the radial tilt detector 20 or the tangential tilt detector 21 shown in FIG. 2. Instead of outputting the central detected signal Scent outputted from the A/D converter 26 as it is to the demodulation unit 12 as shown in FIG. 2, however, it is also possible to connect the radial tilt detector 20' shown in FIG. 17 and the tangential tilt detector 21' shown in FIG. 18 in series, input the central detected signal Scent' generated in the radial tilt detector 20' to the tangential tilt detector 21' as the central detected signal Scent in the tangential tilt detector 21', output a delayed signal $Sd_1$' obtained as a result thereof to the demodulation unit 12, and thereby reproduce the information. In this case, the tilt amount of the radial direction is detected and the inner crosstalk and the outer crosstalk are removed from the central detected signal Scent in the radial tilt detector 20'. Subsequently, in the tangential tilt detector 21', the tilt amount of the tangential direction is detected, the front crosstalk and the rear crosstalk are removed from the central detected signal Scent', and the delayed signal $Sd_1$' is outputted. On the basis thereof, the information is reproduced.

(IV) Fourth Embodiment

A fourth embodiment which is another embodiment of the present invention will now be described by referring to FIGS. 19 to 21.

First of all, the principle of the fourth embodiment is now described. When a tilt occurs in, for example, the radial direction, the optical spot spreads in the radial direction as shown in FIG. 3A or 3C. As compared with the case where there is no tilt, therefore, the total amount of the crosstalk (i.e., the sum of the inner crosstalk amount and the outer crosstalk amount) increases. In other words, the total amount of crosstalk becomes the minimum when there is no tilt.

In the tangential direction as well, there is no tilt when the sum of the front crosstalk amount and the rear crosstalk amount becomes the minimum, in the same way.

In the fourth embodiment, therefore, the sum of the inner crosstalk amount and the outer crosstalk amount and the sum of the front crosstalk amount and the rear crosstalk amount are separately calculated respectively for the radial direction and the tangential direction. The liquid crystal panel 3 is driven so as to minimize them respectively. The wavefront aberration caused by the tilt in each direction is thus corrected.

Next, an information reproducing apparatus in the fourth embodiment will now be described by referring to FIGS. 19 to 21.

First of all, the entire configuration of a signal process unit in the information reproducing apparatus of the fourth embodiment is described by referring to FIG. 19. In the information reproducing apparatus of the fourth embodiment, the configuration other than the signal process unit is the same as that of the information reproducing apparatus S of the first embodiment. Consequently, the same constitutional elements as those of the first embodiment carry the same reference numerals and the detailed descriptions thereof are omitted.

As shown in FIG. 19, a signal process unit 11" of the fourth embodiment is obtained from the signal process unit 11 of the first embodiment by replacing the subtracters 32 and 35 respectively with adders 104 and 105, and replacing the radial tilt controller 22 and the tangential tilt controller 23 respectively with a radial tilt controller 106 and a tangential tilt controller 107. The remaining configuration is the same as that of the signal process unit 11 of the first embodiment.

Next, the entire operation of the signal process unit 11" is described.

As for the tilt in the radial direction, the crosstalk amount detection unit 30 and the crosstalk amount detection unit 31 of the first embodiment generates the inner crosstalk signal Scti and the outer crosstalk signal Scto and supply them to the adder 104 on the basis of the inner detected signal Sin, the outer detected signal Sout, and the central detected signal Scent inputted to the radial tilt detector 20" in the signal process unit 11".

Then, the adder 104 adds the inner crosstalk signal Scti and the outer crosstalk signal Scto together and generates a sum signal Srsum representing the sum of the inner crosstalk amount and the outer crosstalk amount.

Thereafter, the radial tilt controller 106 generates a tilt correction control signal $Sc_1$' so as to minimize the sum signal Srsum, drives the liquid crystal panel 3 therewith, and corrects the wavefront aberration in the radial direction.

As for the tilt of the tangential direction, the delay circuits 36 and 37, and the crosstalk amount detection unit 33 and the crosstalk amount detection unit 34 of the first embodiment generates the front crosstalk signal Sctf and the rear crosstalk signal Sctr and supply them to the adder 105 on the basis of the central detected signal Scent inputted to the radial tilt detector 21" in the signal process unit 11".

The adder 105 adds the front crosstalk signal Sctf and the rear crosstalk signal Sctr together and generates a sum signal Stsum representing the sum of the front crosstalk amount and the rear crosstalk amount.

Thereafter, the radial tilt controller 106 generates a tilt correction control signal $Sc_2$' so as to minimize the sum signal Stsum, drives the liquid crystal panel 3 therewith, and corrects the wavefront aberration in the tangential direction.

The configuration of the radial tilt controller 106 and the tangential tilt controller 107 will now be described by referring to FIG. 20. The radial tilt controller 106 and the tangential tilt controller 107 have the same basic configuration. In the ensuing description, therefore, the radial tilt controller 106 will be described as a representative.

Figure 20A:
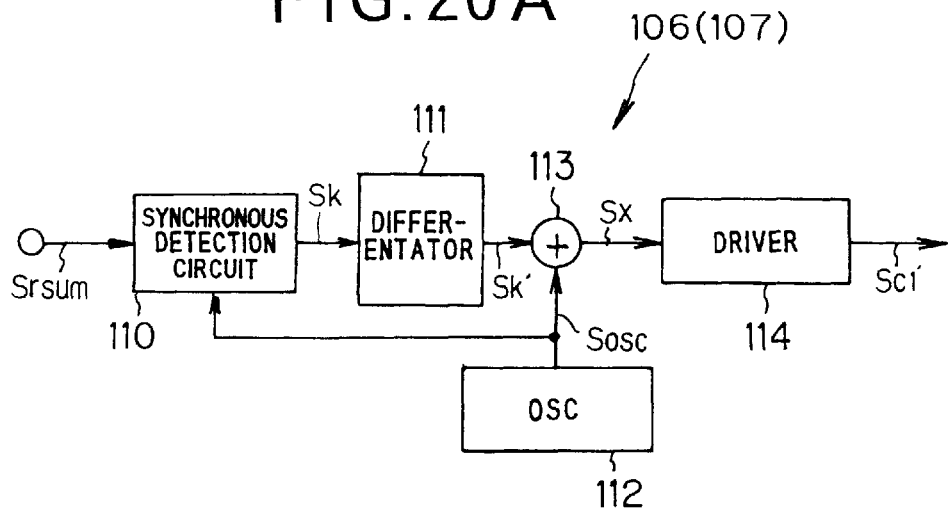
FIG. 20A is a block diagram showing a schematic configuration of a radial tilt controller of the fourth embodiment.
Figure 20B:
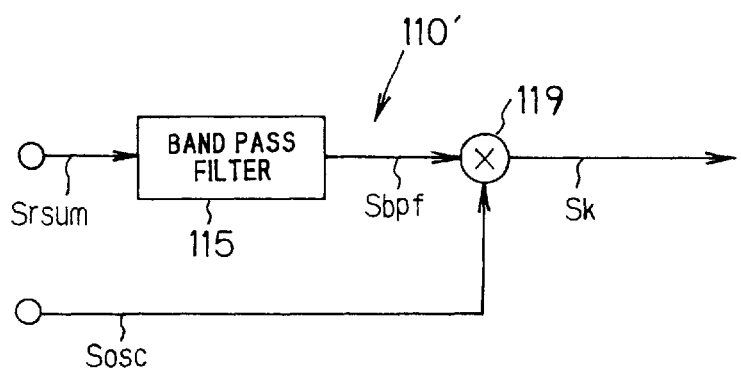
FIG. 20B is a block diagram (I) showing a schematic configuration of a synchronous detector of the fourth embodiment.

As shown in FIG. 20A, the radial tilt controller 106 includes: a synchronous detection circuit 110; an integrator 111; an adder 113; an oscillator 112; and a driver 114.

Figure 20C:
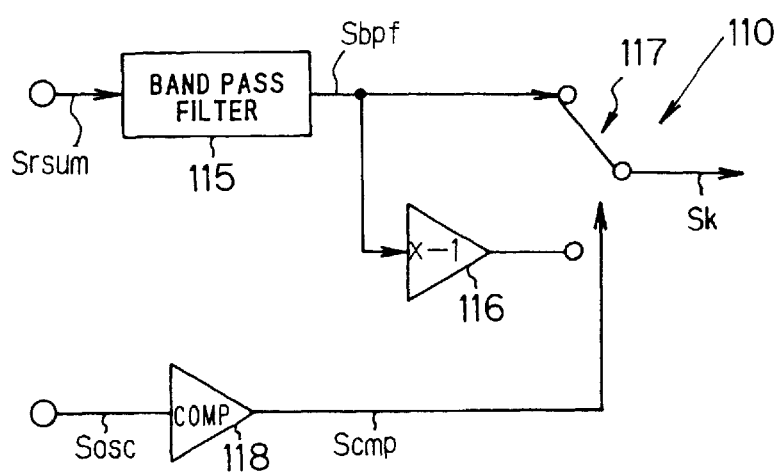
FIG. 20C is a block diagram (II) showing a schematic configuration of the synchronous detector of the fourth embodiment.

As shown in FIG. 20C, the synchronous detection circuit 110 includes: a band pass filter 115; an inverter 116; a switch 117; and a comparator 118.

The entire operation of the radial tilt controller 106 is now described by referring to FIG. 20A.

In the synchronous detection circuit 110, the sum signal Srsum inputted to the radial tilt controller 106 is subjected to a synchronous detection as described later on the basis of a wobbling signal Sosc (having such an amplitude and a period as not to affect the correction of the wavefront aberration conducted by the liquid crystal panel 3) supplied from the oscillator 112. A detected signal Sk representing the tilt amount of the radial direction is thus generated.

The detected signal Sk is averaged in the integrator 111. An averaged signal Sk' having a fixed level is thus generated.

Thereafter, the wobbling signal Sosc and the averaged signal Sk' are added together in the adder 113. As a result, the averaged signal Sk' is wobbled by the wobbling signal Sosc. A resultant signal is inputted to the driver 114 as a superposed averaged signal Sx.

The driver 114 generates a tilt correction control signal $Sc_1$' and outputs it to the liquid crystal panel 3 in order to drive the liquid crystal panel 3 in such a direction as to reduce the absolute value of the averaged signal Sk' contained in the superposed averaged signal Sx and thereby correct the wavefront aberration.

Next, a detailed operation of the synchronous detection circuit 110 will now be described by referring to FIG. 20A, FIG. 20C and FIG. 21.

First of all, the case where the tilt in the radial direction is positive is described.

The comparator 118 judges the polarity of the wobbling signal Sosc (as shown in the right uppermost stage of FIG. 21 A), generates a decision signal Scmp alternating in polarity according to the polarity change of the wobbling signal Sosc (as shown in a third uppermost right stage of FIG. 21A), and outputs the decision signal Scmp to the switch 117.

On the other hand, the band pass filter 115 removes the noise contained in the sum signal Srsum (since the tilt is positive, its center level is also shifted in the positive direction) and outputs a band pass signal Sbpf.

Figure 21A:
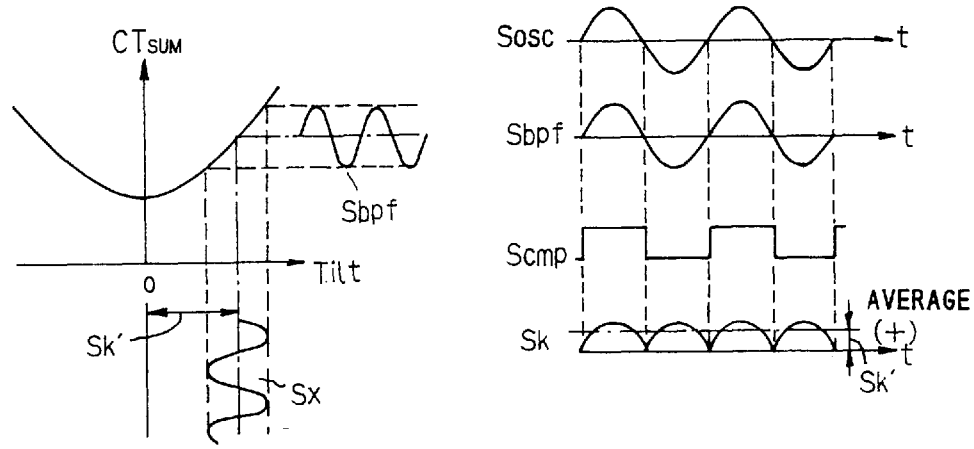
FIG. 21A is a diagram showing an operation of the radial tilt controller of the fourth embodiment when the polarity of the tilt is positive.

The waveform of the band pass signal Sbpf will now be described by referring to the left part of FIG. 21A (which shows the relation between the sum of the inner crosstalk amount and the outer crosstalk amount and the tilt). Since a tilt currently occurs in a positive direction, the superposed averaged signal Sx for driving the driver 114 also has its center (the averaged signal Sk') shifted in the positive direction. Therefore, the center level of the sum signal Srsum obtained by the irradiation of the optical beam B corrected in the wavefront aberration on the basis of the tilt correction control signal $Sc_1$' which is generated on the basis of the superposed averaged signal Sx deviated in the positive direction is also deviated in the positive direction. As a result, the band pass signal Sbpf also has a waveform as shown in a left part and a right part of FIG. 21A.

The band pass signal Sbpf having such a waveform is inputted to one terminal of the switch 117. The band pass signal Sbpf inverted in polarity by the inverter 116 is inputted to the other terminal of the switch 117. The switch 17 is changed over by the decision signal Scmp corresponding to the polarity of the wobbling signal Sosc. By doing so, the waveform of the detected signal Sk becomes as shown in the lowermost right stage of FIG. 21A. Therefore, the averaged signal Sk' which is its average value also becomes positive.

Therefore, the driver 114 generates and outputs the tilt correction control signal $Sc_1$' so as to move the average value (i.e., the level of the averaged signal Sk') of the superposed averaged signal Sx, which is obtained by superposing the wobbling signal Sosc onto the averaged signal Sk', into the negative direction. As a result, the tilt occurring in the positive direction is gradually decreased.

Next, the case where the tilt in the radial direction is negative is described.

The comparator 118 judges the polarity of the wobbling signal Sosc (as shown in the right uppermost stage of FIG. 21 C), generates the decision signal Scmp alternating in polarity according to the polarity change of the wobbling signal Sosc (as shown in a third uppermost right stage of FIG. 21C), and outputs the decision signal Scmp to the switch 117.

On the other hand, the band pass filter 115 removes the noise contained in the sum signal Srsum (since the tilt is negative, its center level is also shifted in the negative direction) and outputs the band pass signal Sbpf.

The waveform of the band pass signal Sbpf will now be described by referring to the left part of FIG. 21C. Since a tilt currently occurs in a negative direction, the superposed averaged signal Sx for driving the driver 114 also has its center shifted in the negative direction. Therefore, the center level of the sum signal Srsum obtained by the irradiation of the optical beam B corrected in the wavefront aberration on the basis of the tilt correction control signal $Sc_1$' is also deviated in the negative direction. As a result, the band pass signal Sbpf also has a waveform as shown in a left part and a right part of FIG. 21C.

Figure 21B:
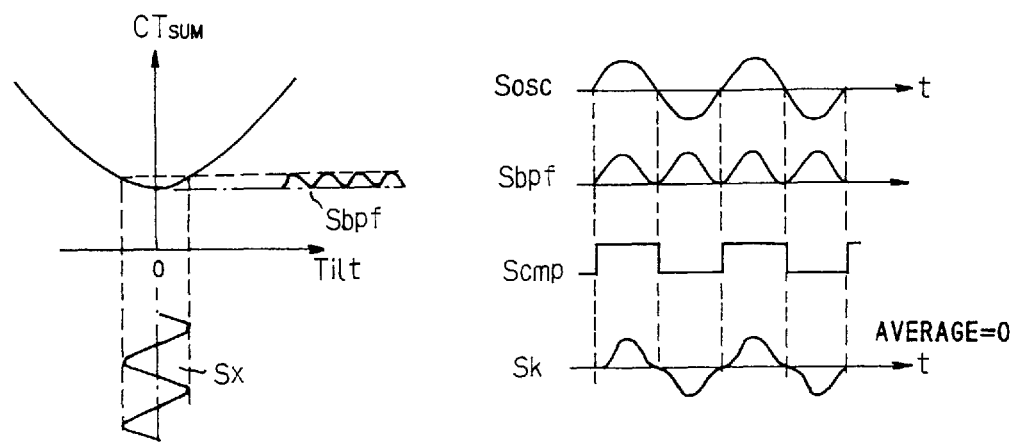
FIG. 21B is a diagram showing an operation of the radial tilt controller of the fourth embodiment when the tilt is not generated.
Figure 21C:
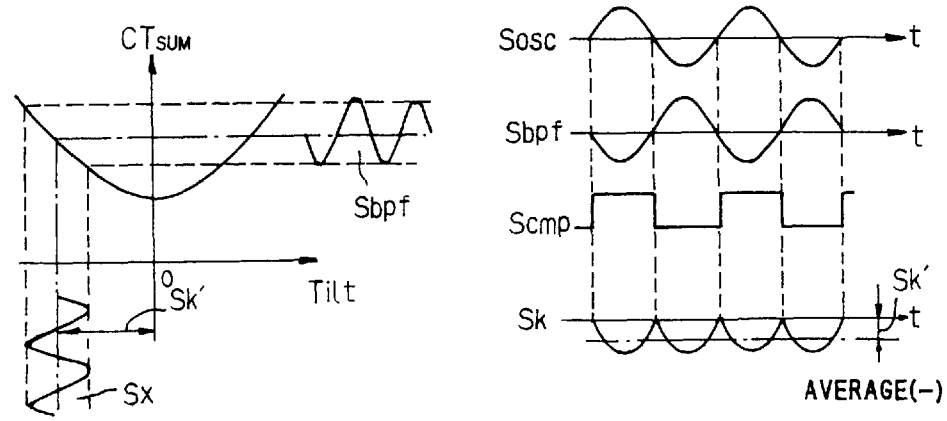
FIG. 21C is a diagram showing an operation of the radial tilt controller of the fourth embodiment when the polarity of the tilt is negative.

Thus, by changing over the switch 17 by the decision signal Scmp corresponding to the polarity of the wobbling signal Sosc, the waveform of the detected signal Sk becomes as shown in the lowermost right stage of FIG. 21C. Therefore, the averaged signal Sk' which is its average value also becomes negative.

Therefore, the driver 114 generates and outputs the tilt correction control signal $Sc_1$' so as to move the average value (i.e., the level of the averaged signal Sk') of the superposed averaged signal Sx, which is obtained by superposing the wobbling signal Sosc onto the averaged signal Sk', into the positive direction. As a result, the tilt occurring in the negative direction is gradually decreased.

Finally, the case where the tilt in the radial direction does not substantially exist is described.

The comparator 118 judges the polarity of the wobbling signal Sosc (as shown in the right uppermost stage of FIG. 21 B), generates the decision signal Scmp (as shown in a third uppermost right stage of FIG. 21B), and outputs the decision signal Scmp to the switch 117.

On the other hand, the band pass filter 115 removes the noise contained in the sum signal Srsum (since the tilt does not substantially exist, its center level is also at a zero level) and outputs the band pass signal Sbpf.

The waveform of the band pass signal Sbpf will now be described by referring to the left part of FIG. 21B. Since a tilt does not substantially exist currently, the superposed averaged signal Sx for driving the driver 114 also has its center at the zero level. Therefore, the center level of the sum signal Srsum obtained by the irradiation of the optical beam B corrected in the wavefront aberration on the basis of the tilt correction control signal $Sc_1$' is also at the zero level. As a result, the band pass signal Sbpf also has a waveform as shown in a left part and a right part of FIG. 21B.

Thus, by changing over the switch 17 by the decision signal Scmp, the waveform of the detected signal Sk becomes as shown in the lowermost right stage of FIG. 21B. Therefore, the averaged signal Sk' which is its average value also becomes substantially zero.

Therefore, the driver 114 generates and outputs the tilt correction control signal $Sc_1$' so as to drive the liquid crystal panel 3 without giving any correction with respect to the light beam B on the basis of the superposed averaged signal Sx, which is obtained by superposing the wobbling signal Sosc onto the averaged signal Sk'. As a result, the correction for the wavefront aberration is not performed since the liquid crystal panel 3 does not give the phase difference to the light beam 3.

By the operations described above, by driving the liquid crystal panel 3 by use of the tilt correction controlling signal $Sc_1$' based on the superimposed averaged signal Sx, whose center level is changed in correspondence with the tilt amount being generated, the wavefront aberration due to the tilt in the radial direction can be corrected.

Incidentally, in the tangential tilt controller 107, by the same operation as that of the above described radial tilt controller 106 on the basis of the sum signal Stsum, the liquid crystal panel 3 is driven by use of the tilt correction controlling signal Sc2 based on the superimposed averaged signal Sx whose center level is changed in correspondence with the tilt amount generated in the tangential direction. Hence, the wavefront aberration due to the tilt in the tangential direction is corrected.

As described above, according to the operation of the information reproducing apparatus of the fourth embodiment, since the tilt is detected on the basis of the center detected signal Scent obtained by the irradiation of the light beam B, it is not necessary to emit an exclusive light beam for the tilt detection besides the light beam B, and it is possible to simplify the structure for the aberration correcting apparatus.

Further, since the mechanical driving portion is not necessary for the aberration correction, the reliability as the aberration correcting apparatus is certainly improved and the reduction in size is prompted.

Therefore, by use of the structure which is simplified and reduced in size, it is possible to exactly correct the aberration due to the tilt of the optical axis of the light beam.

It is also possible to correct the wavefront aberration by exactly detecting the tilts in the respective directions as the radial tilt is detected by use of the inner detected signal Sin or the outer detected signal Sout from the adjacent track and the tangential tilt is detected by use of the center detected signal Scent.

Moreover, since the inner crosstalk amount and the outer crosstalk amount are detected and the wavefront aberration generated in the radial direction is corrected so as to minimize the sum of these crosstalk amounts, the wavefront aberration can be exactly corrected by means of a simple structure.

Since the wavefront aberration is corrected by use of the liquid crystal panel 3 disposed on the optical path of the light beam B, the wavefront aberration can be corrected by means of a simple structure.

Since the wavefront aberration is corrected by giving the phase difference to the light beam B by applying the voltage based on the tilt to the liquid crystal panel 3g or 3m of the liquid crystal panel 3, it is possible to correct the wavefront aberration of the light beam B efficiently.

Since the transparent electrode of the liquid crystal panel 3 are constructed so as to include a plurality of pattern electrodes having the shapes corresponding to the distribution of the wavefront aberration generated in the light beam B, and since the radial tilt controller 106 or the tangential tilt controller 107 corrects the wavefront aberration by applying the voltage separately to each of the pattern electrodes, it is possible to correct the wavefront aberration efficiently.

Since the light beam B is collected on the optical disc 1 by the objective lens 2 and the record information is reproduced by the demodulation unit 12, it is possible to accurately reproduce the record information with correcting the wavefront aberration due to the inclination of the optical axis by means of the simple structure.

Incidentally, in the above described fourth embodiment, the crosstalk amount detection unit 30' of the second embodiment may be employed, in place of the crosstalk mount detection units 30, 31, 33 or 34.

Further, in the above described fourth embodiment, it is possible to employ, in place of the radial tilt detection unit 20" or tangential tilt detection unit 21", such a configuration that the subtracter 32 is replaced by the adder 104 in the radial tilt detection unit 20' of the third embodiment or the subtracter 35 is replaced by the adder 105 in the tangential tilt detection unit 21' of the third embodiment.

In addition, the synchronous detection circuit 110 may have such a configuration of having the band pass filter 115 and the multiplier 119 multiplying the band pass signal Sbpf with the wobbling signal Sosc, other than the configuration shown in FIG. 20C, so as to realize the above described operation.

(V) Fifth Embodiment

A fifth embodiment which is another embodiment of the present invention will now be described by referring to FIGS. 22A to 22C.

The fifth embodiment is to perform the operations of the radial tilt controller 106 or the tangential tilt controller 107 in the above described fourth embodiment, by means of the software.

In the information reproducing apparatus of the fifth embodiment, the configuration other than the radial tilt controller or the tangential tilt controller is the same as that of the information reproducing apparatus of the fourth embodiment. Consequently, the same constitutional elements as those of the fourth embodiment carry the same reference numerals and the detailed descriptions thereof are omitted. In addition, the radial tilt controller and the tangential tilt controller have the same basic configuration. In the ensuing description, therefore, the radial tilt controller will be described as a representative.

Figure 22A:
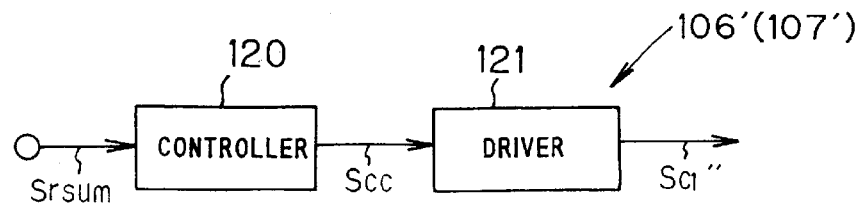
FIG. 22A is a block diagram showing an schematic configuration of a radial tilt controller of a fifth embodiment.
Figure 22B:
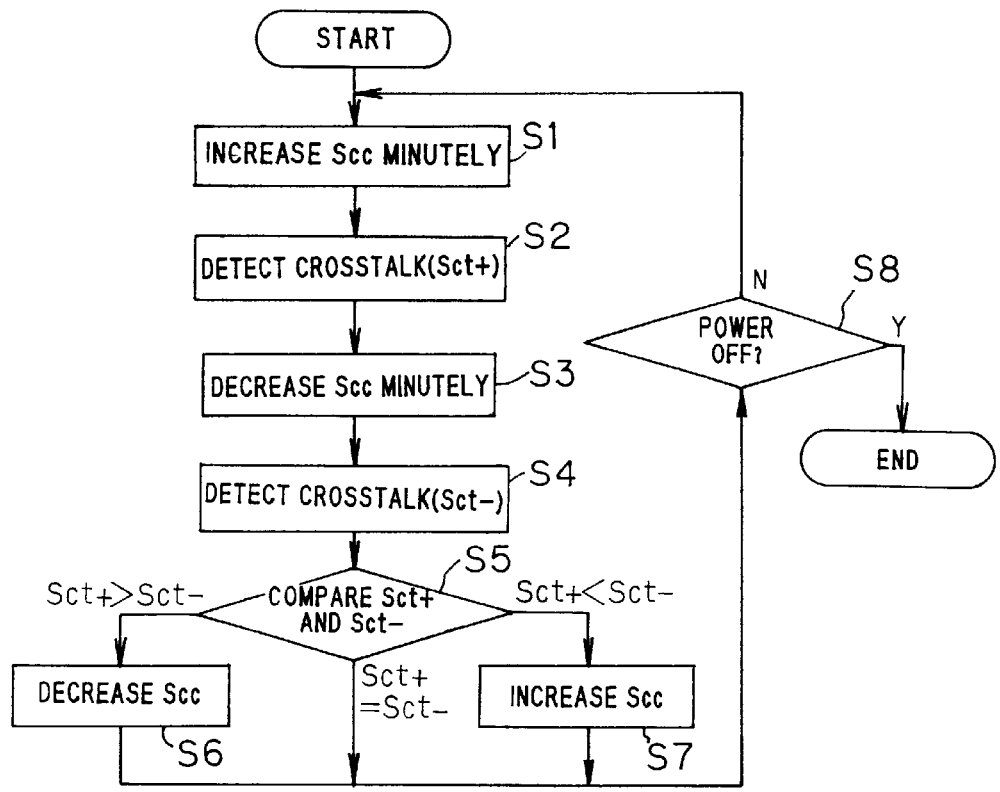
FIG. 22B is a flow chart showing an operation of the radial tilt controller of the fifth embodiment.
Figure 22C:
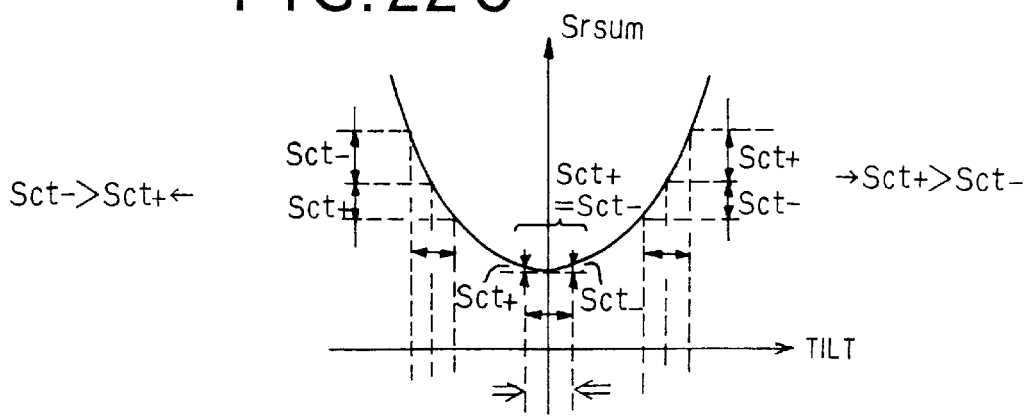
FIG. 22C is a diagram showing the operation of the radial tilt controller of the fifth embodiment.

As shown in FIG. 22A, the radial tilt controller 106' in the information reproducing apparatus of the fifth embodiment includes: a controller 120 such as a CPU; and a driver 12. Within the controller 120, a ROM (Read Only Memory) is included which stores in advance a software program corresponding to a flow chart indicating an operation described later (FIG. 22B).

Next, the operation of the radial tilt controller 106' will be explained with referring to FIG. 22B and 22C.

In the controller 120 to which the sum signal Srsum is being inputted, at first, the control signal Scc outputted from the controller 120 to drive the driver 121 is increased by a minute amount (Step S1). The driver 121 is driven by this control signal Scc, so that the tilt correction controlling signal Sc1" to drive the liquid crystal panel 3 in the radial direction is generated.

Then, the liquid crystal panel 3 is actually driven by the tilt correction controlling signal Sc1", so that the crosstalk signal Sct+ is detected, which is the change of the sum signal Srsum resulting from the correction of the wavefront aberration of the light beam B (Step S2).

Then, the control signal Scc is decreased by a minute amount (whose absolute value is the same as that increased at the Step S1) from a condition before the Step S1 (Step S3). The driver 121 is driven by this control signal Scc, so that the tilt correction controlling signal Sc1" is generated.

Then, the liquid crystal panel 3 is actually driven by the tilt correction controlling signal Sc1", so that the crosstalk signal Sct− is detected, which is the change of the sum signal Srsum resulting from the correction of the wavefront aberration of the light beam B (Step S4).

Then, the crosstalk amount Sct+ and the crosstalk amount Sct− which are detected in the above manner are compared with each other (Step S5). If the crosstalk amount Sct+ is larger than the crosstalk amount Sct− (Sct+>Sct−), since the tilt in the radial direction is generated in the positive direction (refer to a first quadrant and a fourth quadrant in FIG. 22C), the control signal Scc to drive the liquid crystal panel 3 is decreased so as to correct the wavefront aberration due to it into the negative direction (Step S6). Then, the tilt correction controlling signal Sc1" corresponding to the driver 121 is generated.

On the other hand, at the Step S5, if the crosstalk amount Sct+ is smaller than the crosstalk amount Sct− (Sct+<Sct−), since the tilt in the radial direction is generated in the negative direction (refer to a second quadrant and a third quadrant in FIG. 22C), the control signal Scc to drive the liquid crystal panel 3 is increased so as to correct the wavefront aberration due to it into the positive direction (Step S7). Then, the tilt correction controlling signal Sc1" corresponding to the driver 121 is generated.

Further, at the Step S5, if the crosstalk amount Sct+ is equal to the crosstalk amount Sct− (Sct+=Sct−), since the tilt in the radial direction is not substantially generated (refer to an axis of the sum signal Srsum in FIG. 22C), the change of the control signal Scc is not necessary. Accordingly, the driver 121 is controlled to generate the tilt correction controlling signal Sc1" as it presently is.

Then, when the changing control of the controlling signal Scc is ended, it is judged whether or not the electric power source of the information reproducing apparatus of the fifth embodiment is turned off (Step S8). If it is turned off (Step S8; YES), the process is ended as it is. If it is not turned off (Step S8; NO), the operation flow returns to the Step S1, so as to repeat the above described tilt correction.

As described above, according to the information reproducing apparatus of the fifth embodiment, since the wavefront aberration is corrected by means of the software, the same effect as that of the fourth embodiment can be attained by a simple configuration.

(VI) Modified Embodiment

Figure 23:
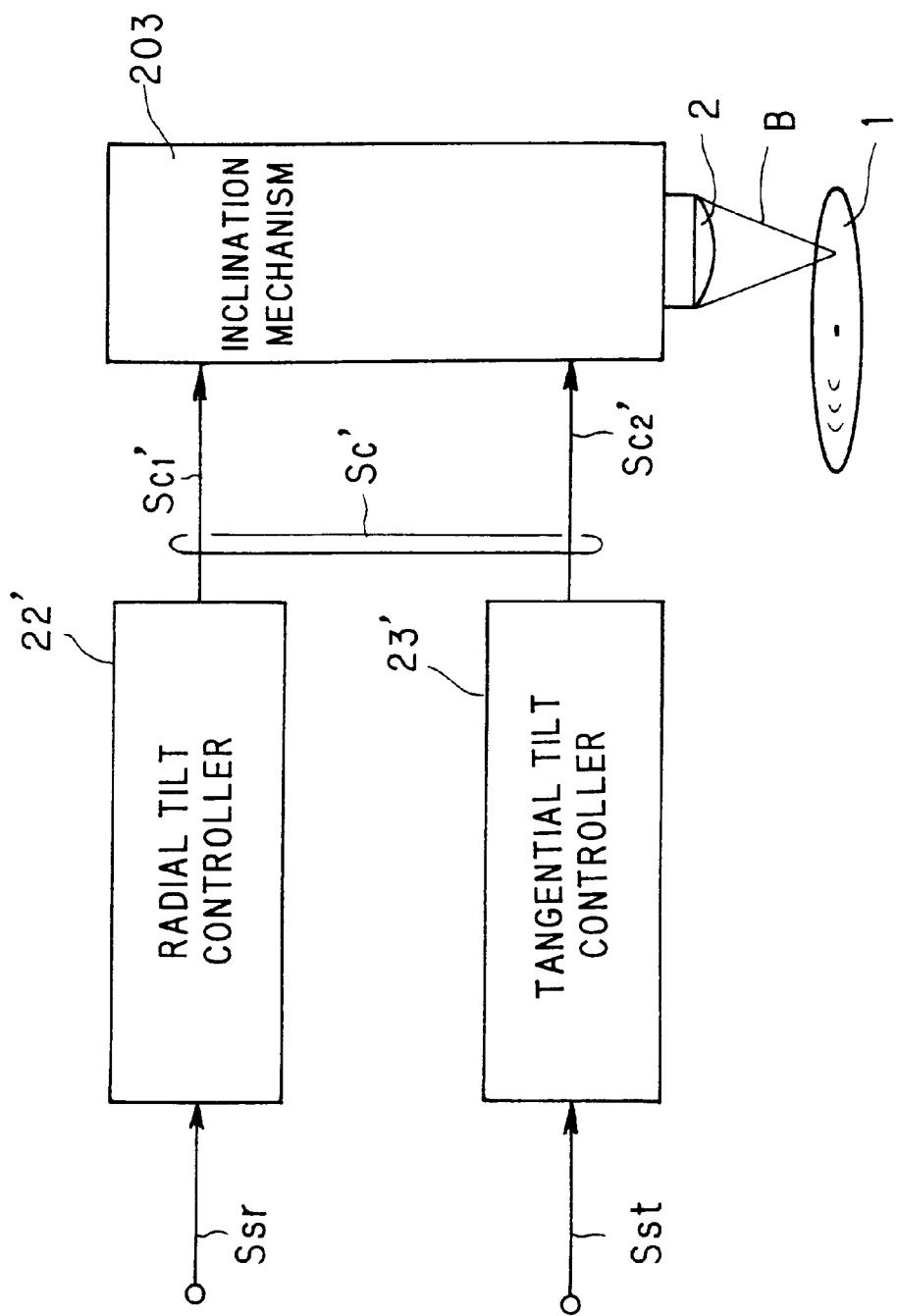
FIG. 23 is a block diagram showing a schematic configuration of a radial tilt controller and a tangential tilt controller of a modified embodiment.

Next, a modified embodiment of the present invention is explained by referring to FIG. 23.

In the above explained each embodiment, the wavefront aberration due to the tilt in each direction is corrected by use of the liquid crystal panel 3 (refer to FIG. 9 etc.,). Other than that, it is possible as the modified embodiment to constitute such that an inclination mechanism 203 is driven as one example of an inclination device by a tilt correction controlling signal Sc' (i.e., a radial tilt correction controlling signal Sc1' generated by a radial tilt controller 22' on the basis of the difference signal Ssr and a tangential tilt correction controlling signal Sc2' generated by a tangential tilt controller 23' on the basis of the difference signal Sst), so as to remove the tilt of the light beam B itself as shown in FIG. 23. The inclination mechanism 203 may be constructed by a known actuator to change the direction of the objective lens 2, the semiconductor laser 7 or the like, such as an electromagnetic actuator. The inclination mechanism 203 may be commonly used as a whole or one portion of the focusing servo actuator, the tracking servo actuator and so on.

According to this modified embodiment, it is not necessary to emit an exclusive light beam for the tilt detection besides the light beam B, and it is possible to simplify the structure for the aberration correcting apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.09-270778 filed on Oct. 3, 1997 including the specification, claims, drawings and summary is incorporated herein by reference in its entirety.

What is claimed is:

1. An aberration correcting apparatus for irradiating a disc type information record medium, on which record information is recorded by forming a spiral or coaxial track, with a light beam, detecting a tilt between an information record surface of said information record medium and an optical axis of the light beam basis of the light detection signal;

and correcting a wavefront aberration generated in the light beam due to the tilt on the basis of the detected tilt, said apparatus comprising:

a light detection device for outputting a center detected signal corresponding to the record information forming a center turn of the track on which the record information to be reproduced is recorded, an inner detected signal corresponding to the record information forming an inner turn of the track located adjacent to the center turn at an inner side thereof and an outer detected signal corresponding to the record information forming an outer turn of the track located adjacent to the center turn at an outer side thereof; and at least one of (i) a tangential tilt detection device for detecting a tangential tilt, which is the tilt in a tangential direction of the track on said disc type record medium, on the basis of the center detected signal and (ii) a radial tilt detection device for detecting a radial tilt, which is the tilt in a radial direction of the track on said disc type record medium on the basis of the inner, center and outer detected signals.

2. An aberration correcting apparatus according to claim 1, wherein:

said radial tilt detection device comprises a crosstalk detection device for detecting (a) an inner crosstalk, which is a crosstalk from the inner detected signal to the center detected signal, and (b) an outer crosstalk, which is a crosstalk from the outer detected signal to the center detected signal, respectively, so as to detect the radial tilt as a difference between the detected inner crosstalk and the detected outer crosstalk;

said apparatus further comprises a correction device for correcting the wavefront aberration generated in the light beam due to the tilt and a driving device for driving said correction device on the basis of the detected tilt; and said driving device drives said correction device so that a value of the radial tilt is reduced to approach a zero.

3. An aberration correcting apparatus according to claim 1, wherein:

said radial tilt detection device comprises a crosstalk detection device for detecting (a) an inner crosstalk, which is a crosstalk from (b) the inner detected signal to the center detected signal, and an outer crosstalk, which is a crosstalk from the outer detected signal to the center detected signal, respectively, so as to detect the radial tilt as a sum of the detected inner crosstalk and the detected outer crosstalk;

said apparatus further comprises a correction device for correcting the wavefront aberration generated in the light beam due to the tilt and a driving device for driving said correction device on the basis of the detected tilt; and said driving device drives said correction device so that a value of the radial tilt is reduced to a minimum.

4. An aberration correcting apparatus according to claim 1, wherein:

said tangential tilt detection device comprises a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a difference between the detected forward crosstalk and the detected backward crosstalk;

said apparatus further comprises a correction device for correcting the wavefront aberration generated in the light beam due to the tilt and a driving device for driving said correction device on the basis of the detected tilt; and said driving device drives said correction device so that a value of the tangential tilt is reduced to approach a zero.

5. An aberration correcting apparatus according to claim 1, wherein:

said tangential tilt detection device comprises a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a sum of the detected forward crosstalk and the detected backward crosstalk;

said apparatus further comprises a correction device for correcting the wavefront aberration generated in the light beam due to the tilt and a driving device for driving said correction device on the basis of the detected tilt; and said driving device drives said correction device so that a value of the tangential tilt is reduced to a minimum.

6. An information reproducing apparatus comprising (I) an aberration correcting apparatus comprising:

a light detection device for irradiating an information record medium, on which record information is recorded, with a light beam, and outputting a light detection signal corresponding to the record information on the basis of a reflection light of the light beam reflected from said information record medium;

a tilt detection device for detecting a tilt between an information record surface of said information record medium and an optical axis of the light beam on the basis of the light detection signal;

a correction device for correcting a wavefront aberration generated in the light beam due to the tilt; and a driving device for driving said correction device on the basis of the detected tilt, (II) a light collecting device for collecting the light beam onto said information record medium, and (III) a reproducing device for reproducing the record information on the basis of the light detection signal, wherein:

said information record medium comprises a disc type record medium on which the record information is recorded by forming a spiral or coaxial track;

said light detection device outputs as the light detection signal a center detected signal corresponding to the record information forming a center turn of the track on which the record information to be reproduced is recorded, an inner detected signal corresponding to the record information forming an inner turn of the track located adjacent to the center turn at an inner side thereof and an outer detected signal corresponding to the record information forming an outer turn of the track located adjacent to the center turn at an outer side thereof; and said tilt detection device comprising at least one of (i) a tangential tilt detection device for detecting a tangential tilt, which is the tilt in a tangential direction of the track on said disc type record medium, on the basis of the center detected signal and (ii) a radial tilt detection device for detecting a radial tilt, which is the tilt in a radial direction of the track on said disc type record medium on the basis of the inner, center and outer detected signals.

7. An information reproducing apparatus according to claim 6, wherein:

(I) said radial tilt detection device comprises a crosstalk detection device for detecting (a) an inner crosstalk, which is a crosstalk from the inner detected signal to the center detected signal, and (b) an outer crosstalk, which is a crosstalk from the outer detected signal to the center detected signal, respectively, so as to detect the radial tilt as a difference between the detected inner crosstalk and the detected outer crosstalk;

said tangential tilt detection device comprises a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a difference between the detected forward crosstalk and the detected backward crosstalk; and said driving device drives said correction device so that each value of the radial tilt and the tangential tilt is reduced to approach a zero, and (II) said reproducing device comprises a subtracter device for subtracting the inner crosstalk, the outer crosstalk, the forward crosstalk and the backward crosstalk from the light detection signal to generate a subtracted light detection signal, and reproduces the record information on the basis of the subtracted light detection signal.

8. An information reproducing apparatus according to claim 6, wherein:

(I) said radial tilt detection device comprises a crosstalk detection device for detecting (a) an inner crosstalk, which is a crosstalk from the inner detected signal to the center detected signal, and (b) an outer crosstalk, which is a crosstalk from the outer detected signal to the center detected signal, respectively, so as to detect the radial tilt as a sum of the detected inner crosstalk and the detected outer crosstalk;

said tangential tilt detection device comprises a crosstalk detection device for detecting (a) a forward crosstalk, which is a crosstalk from a forward detected signal, which is the center detected signal detected at a time t1, to an intermediate detected signal, which is the center detected signal detected at a time T2 later than the time t1, and (b) a backward crosstalk, which is a crosstalk from a backward detected signal, which is the center detected signal detected at a time T3 later than the time t2, to the intermediate detected signal, respectively, so as to detect the tangential tilt as a sum of the detected forward crosstalk and the detected backward crosstalk; and said driving device drives said correction device so that each value of the radial tilt and the tangential tilt is reduced to a minimum, and (II) said reproducing device comprises a subtracter device for subtracting the inner crosstalk, the outer crosstalk, the forward crosstalk and the backward crosstalk from the light detection signal to generate a subtracted light detection signal, and reproduces the record information on the basis of the subtracted light detection signal.

* * * * *

UNITED STATES PATENT AND TRADEMARK OFFICE
CERTIFICATE OF CORRECTION

PATENT NO. : 6,246,648 B1
DATED : June 12, 2001
INVENTOR(S) : Hiroki Kuribayashi It is certified that error appears in the above-identified patent and that said Letters Patent is hereby corrected as shown below:

<u>Column 38,</u>
Line 3, cancel "basis of the light detection signal".

Signed and Sealed this

Twenty-eighth Day of May, 2002

Attest:

JAMES E. ROGAN
*Attesting Officer*  *Director of the United States Patent and Trademark Office*